(12) United States Patent
Akashi et al.

(10) Patent No.: US 8,139,236 B2
(45) Date of Patent: Mar. 20, 2012

(54) ON-DEMAND PUBLISHING SYSTEM

(75) Inventors: Masamichi Akashi, Funabashi (JP);
Masayuki Sakura, Kawasaki (JP);
Masanori Matsuzaki, Yokohama (JP);
Makoto Anno, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1061 days.

(21) Appl. No.: 11/406,445

(22) Filed: Apr. 19, 2006

(65) Prior Publication Data

US 2006/0238793 A1 Oct. 26, 2006

(30) Foreign Application Priority Data

Apr. 26, 2005 (JP) .................................. 2005-128619

(51) Int. Cl.
*G06K 15/00* (2006.01)
*H04N 1/40* (2006.01)
*H04N 1/04* (2006.01)

(52) U.S. Cl. ..................... 358/1.12; 358/448; 358/498

(58) Field of Classification Search ................ 358/1.15, 358/1.13, 1.2, 448, 498; 400/188, 279, 578; 715/200, 700, 769, 837, 845, 859; D18/36, D18/46, 50, 34, 1; 355/78
See application file for complete search history.

(56) References Cited

U.S. PATENT DOCUMENTS

| | | | | |
|---|---|---|---|---|
| 7,061,636 B2 * | 6/2006 | Ryan et al. .................... | 358/1.15 |
| 2002/0097407 A1 * | 7/2002 | Ryan et al. .................... | 358/1.1 |
| 2002/0118382 A1 | 8/2002 | Jackelen | |
| 2002/0120742 A1 | 8/2002 | Cherry | |
| 2003/0053126 A1 * | 3/2003 | Hughes et al. ................ | 358/1.15 |
| 2003/0103235 A1 * | 6/2003 | Gomi ............................ | 358/1.15 |
| 2004/0088207 A1 * | 5/2004 | Fromherz ......................... | 705/8 |
| 2004/0190057 A1 * | 9/2004 | Takahashi et al. ............. | 358/1.15 |
| 2005/0226646 A1 | 10/2005 | Bardolatzy et al. | |
| 2006/0039707 A1 * | 2/2006 | Mima ............................. | 399/23 |
| 2006/0238777 A1 | 10/2006 | Anno et al. ..................... | 358/1.1 |
| 2006/0239708 A1 | 10/2006 | Kozuka et al. .................. | 399/75 |

(Continued)

FOREIGN PATENT DOCUMENTS

JP 11-105455 4/1999

(Continued)

OTHER PUBLICATIONS

Fraunhofer-IGD, CIP3 Print Production Format, 1998, Fraunhofer-IGD, PDF pp. 1-32.*
U.S. Appl. No. 11/410,107, filed Apr. 25, 2006, Takashi Ono.

(Continued)

*Primary Examiner* — Benny Tieu
*Assistant Examiner* — Ngon Nguyen
(74) *Attorney, Agent, or Firm* — Fitzpatrick, Cella, Harper & Scinto

(57) ABSTRACT

According to the present invention an information processing apparatus comprises: a loading unit which loads function information representing a function of the post-printing processing device; an identification unit which identifies a printing function processible by the printing device and a post-processing function processible after printing by the post-printing processing device; a display control unit which displays a setting window for setting the printing function and post-processing function; a data generation unit which generates printing data to be printed by the printing device; a setting information generation unit which generates post-processing setting information subjected to post-printing processing by the post-printing processing device; and wherein the printing data is transmitted to the printing device, and the post-processing setting information is transmitted to the post-printing processing device.

12 Claims, 35 Drawing Sheets

U.S. PATENT DOCUMENTS

2007/0217811 A1 9/2007 Bardolatzy et al.

FOREIGN PATENT DOCUMENTS

| | | |
|---|---|---|
| JP | 2002-341610 | 11/2002 |
| JP | 2003-212427 | 7/2003 |
| JP | 2004-78449 | 3/2004 |
| WO | 2004/038578 A2 | 5/2004 |

OTHER PUBLICATIONS

Chinese Office Action dated Apr. 20, 2007, issued in corresponding Chinese patent application No. 2006100770990, and English translation.

Communication dated Aug. 9, 2011, issued by the European Patent Office in 06113052.2.

* cited by examiner

F I G. 5B
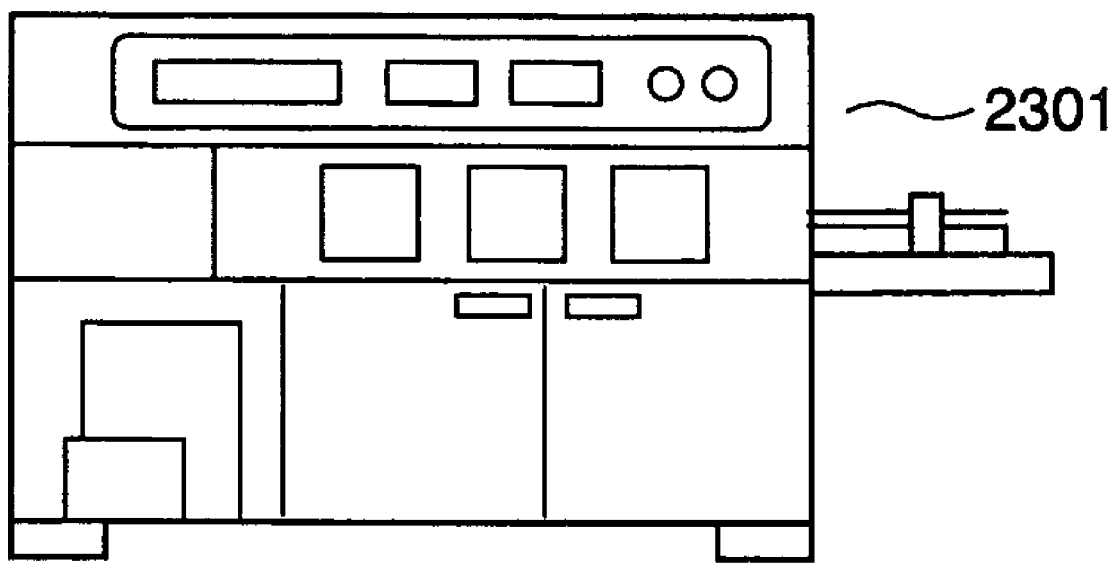

FIG. 7

```xml
<!--BOOKBINDING APPARATUS FUNCTION INFORMATION-->
<FINISHING>
<FINISHING.FinishingType FinishingType="Bookbinding"/>
<FINISHING.Manufacturer Manufacturer="ABC"/>
<FINISHING.ProductName ProductName="11ABC"/>
    <Booklet>
        <Booklet.BookletTypes Booklet.NumType="6"/>
            <Booklet.BookletType Booklet.BookletTypeName="SADDLE STITCHING FOLD"/>
            <Booklet.BookletType Booklet.BookletTypeName="FLAT STITCHING"/>
            <Booklet.BookletType Booklet.BookletTypeName="CORNER STITCHING"/>
            <Booklet.BookletType Booklet.BookletTypeName="HALF FOLD"/>
            <Booklet.BookletType Booklet.BookletTypeName="FLAT STITCHING FOLD"/>
            <Booklet.BookletType Booklet.BootdetTypeName="CORNER STITCHING FOLD"/>
        </Booklet.BookletTypes>
    </Booklet>
    <Medium>
        <Medium.Type NumMediumType="2">
            <Medium.Type MediumTypeName="Plain"/>
            <Medium.Type MediumTypeName="Fine"/>
        </Medium.Type>
        <Medium.Weight MediumWeightCriterion="4-6Size">
            <Medium.Weight MediumWeightMin="60kg"/>
            <Medium.Weight MediumWeightMax="120kg"/>
        </Medium.Weight>
    </Medium>
    <StapleSpaceInterval>
        <StapleSpaceInterval.Adjust Adjustable="FALSE"/>
        <StapleSpaceInterval.Interval Interval="100mm"/>
    </StapleSpaceInterval>
</FINISHING>
```

FIG. 8

```
<!--CUTTING APPARATUS FUNCTION INFORMATION-->
<FINISHING>
<FINISHING.FinishingType FinishingType="Cutting"/>
<FINISHING.Manufacturer Manufacturer="XYZ"/>
<FINISHING.ProductName ProductName="10XYZ"/>
        <Cutting >
                <MaxInputDimensions>
                        <MaxInputDimensions.X X="360mm"/>
                        <MaxInputDimensions.Y Y="360mm"/>
                </MaxInputDimensions>
                <MaxOutputDimenstons>
                        <MaxOutputDimensions.X X="310mm"/>
                        <MaxOutputDimensions.Y Y="310mm"/>
                </MaxOutputDimensions>
                <MinOutputDimensions>
                        <MinOutputDimensions.X X="80mm"/>
                        <MinOutputDimensions.Y Y="150mm"/>
                </MinOutputDimensions>
                <MaxThickness Thickness="70mm"/>
        </Cutting >
</FINISHING>
```

FIG. 10

| # (Unsigned short) 1002 | Finisher Name (String) 1003 | Manufacturer (String) 1004 | Profile Name (String) 1005 | Connected (Boolean) 1006 |
|---|---|---|---|---|
| 1 | Finisher-A | ABC | finisher-a-of-abc.xml | false |
| 2 | Finisher-B | ABC | finisher-b-of-abc.xml | false |
| 3 | Finisher-C | ABC | finisher-c-of-abc.xml | false |
| 4 | Binder-ABC | ABC | binder-abc-of-abc.xml | false |
| 5 | Finisher-X | XYZ | finisher-x-of-xyz.xml | true |
| 6 | Finisher-Y | XYZ | finisher-y-of-xyz.xml | false |
| 7 | Finisher-Z | XYZ | finisher-z-of-xyz.xml | false |
| .. | .. | .. | .. | .. |

| # (Unsigned short) | Finisher Name (String) | Manufacturer (String) | Profile Name (String) | Connected (Boolean) 1601 |
|---|---|---|---|---|
| 1 | Finisher-A | ABC | finisher-a-of-abc.xml | false |
| 2 | Finisher-B | ABC | finisher-b-of-abc.xml | false |
| 3 | Finisher-C | ABC | finisher-c-of-abc.xml | false |
| 4 | Binder-ABC | ABC | binder-abc-of-abc.xml | false |
| 5 | Finisher-X | XYZ | finisher-x-of-xyz.xml | true |
| 6 | Finisher-Y | XYZ | finisher-y-of-xyz.xml | true |
| 7 | Finisher-Z | XYZ | finisher-z-of-xyz.xml | false |
| .. | .. | .. | .. | .. |

F I G. 24

```
<JDF xmlns="http://www.CIP4.org/JDFSchema_1_1"
ID="CombinedStitch" JobID="SaddleStitchCut
special" Type="Combined" Types="SaddleStitching Cutting" Version="1.2">
  <ResourcePool>
    <SaddleStitchingParams Class="Parameter" ID="Saddle" NumberOfStitches="2"/>
    <CuttingParams Class="Parameter" ID="Cut"/>
  </ResourcePool>
  <ResourceLinkPool>
    <RunListLink CombinedProcessIndex="0" Usage="Input" rRef="L1"/>
    <DigitalPrintingParamsLink CombinedProcessIndex="0" Usage="Input" rRef="L2"/>
    <SaddleStitchingParamsLink CombinedProcessIndex="0"
Usage="Input" rRef="Saddle"/>
    <CuttingParamsLink CombinedProcessIndex="1" Usage="Input" rRef="Cut"/>
  </ResourceLinkPool>
```

2600 — `<JDF ...>` line
2601 — `<SaddleStitchingParams ...>`
2602 — `<CuttingParams ...>`
2603 — `<ResourceLinkPool>`

FIG. 31

| PRIORITY (3101) | FINISHER NAME (3102) | MANUFACTURER (3103) |
|---|---|---|
| 1 | NEAR-LINE BOOKBINDING APPARATUS WITH SADDLE STITCH FUNCTION | ABC |
| 2 | IN-LINE BOOKBINDING APPARATUS WITH SADDLE STITCH FUNCTION | DEF |

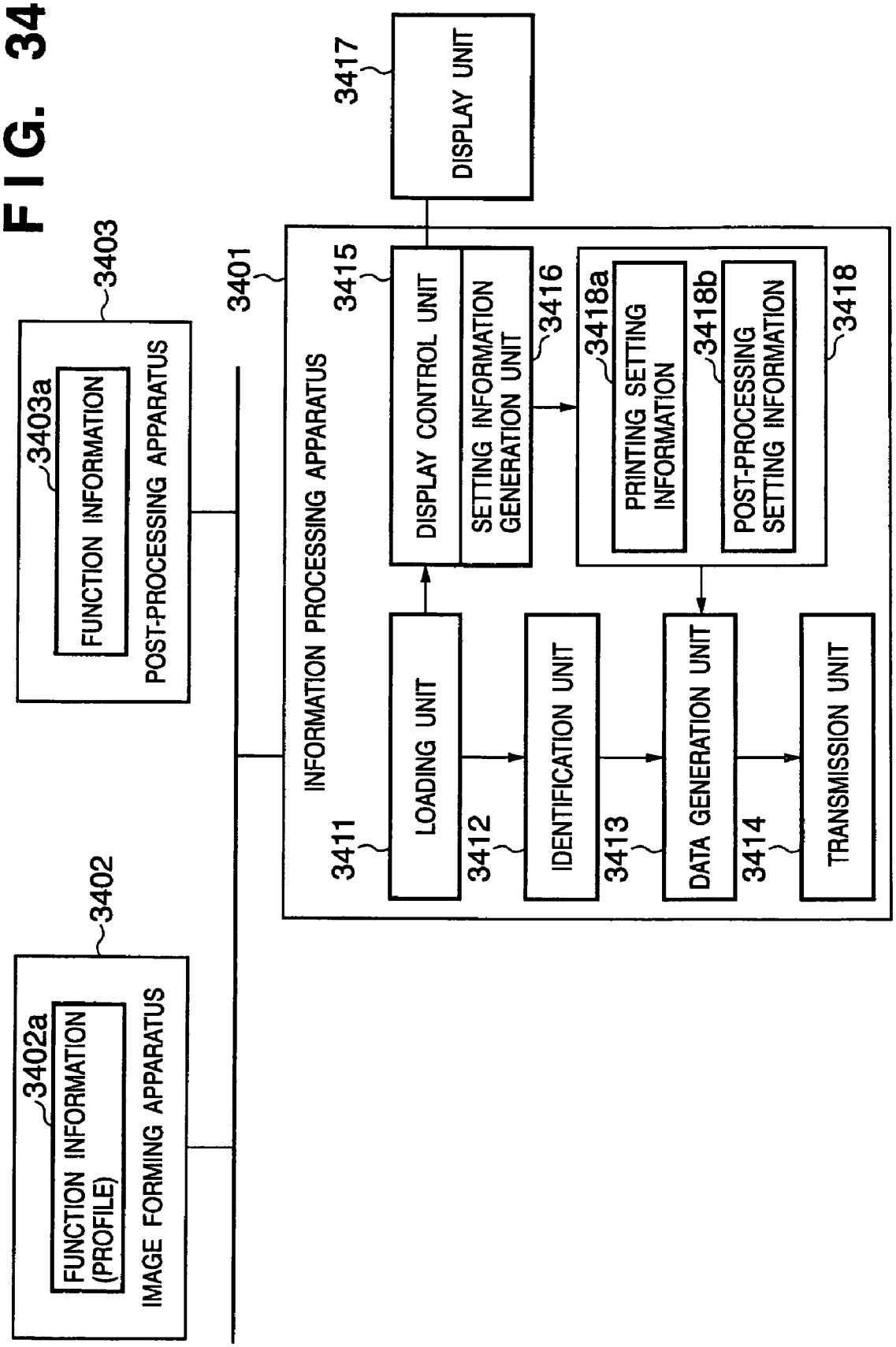

ON-DEMAND PUBLISHING SYSTEM

FIELD OF THE INVENTION

The present invention relates to an information processing apparatus which outputs printing information to a printing apparatus and post-processing information to a post-processing apparatus in a printing system configured by connecting, by a network, an image forming apparatus (e.g., a digital copying machine), a post-processing apparatus (e.g., an in-line finisher, near-line finisher, or off-line finisher), and a client computer in which a printer driver for controlling the image forming apparatus is installed, and a control method therefor.

BACKGROUND OF THE INVENTION

Terms will be explained. A finisher means a post-printing processing apparatus, and is also called a post-press process apparatus or simply a post-processing apparatus. The finisher executes various processes such as bookbinding, cutting, stapling, punching, and collate. Some finishers have multiple functions, and some have single functions.

Feature information of an apparatus is information representing the specifications of the apparatus, describes the features (e.g., functions) of the apparatus, and is also called property information. Feature information of the finisher contains information representing the functions of the apparatus, and the feeding order and direction of paper sheets. In the following embodiments, feature information is synonymous with function information.

Printing attributes are information for specifying how to print, and contain designation of double/single face printing, designation of face-up/face-down, the number of print copies, the paper size, and the layout. In the following embodiments, the printing attributes are synonymous with printing setting information. The printing attributes can be changed by the user within the range of functions of a printing apparatus from a user interface window provided by an application program or printer driver.

Conventionally, when a printing apparatus and finisher are separated in performing post-printing processing of a printed product using a finisher, the operator must set the printout product on the finisher. In order to facilitate this work, the printing apparatus desirably discharges a printed product in accordance with the specifications (feature information) of the finisher. There has conventionally been proposed a method of controlling printing attributes in printing by using feature information of the finisher. This method is implemented by the first method of controlling printing attributes in accordance with feature information of the finisher in printing, or the second method of controlling the function items of the user interface of the printer driver in accordance with feature information of the finisher. The function items are items for setting printing attributes by the user.

As the first method of controlling printing attributes in printing, the printer driver automatically sets printing attributes in generating a printing job in accordance with feature information of the finisher. In a printing system described in patent reference 1, the controller of a printing apparatus acquires information on the following two items associated with a bookbinding apparatus connected to the printing apparatus:

(1) information representing whether to pick up a paper sheet from the top of a set document stack or from the bottom; and (2) information representing whether to set a document with facing up or down.

Based on these two pieces of information, the controller automatically sets the page output order (ascending/descending order) and the page output face (face-up/face-down) so as to allow the operator to directly set a discharged printout product on the bookbinding apparatus and bind the product. Since this control is performed by the controller, the user need not consider information on these two items in imposition.

As the second method of controlling the function items of the user interface of the printer driver, the type of finisher mounted in a printer is identified manually or automatically, and the function items of the user interface are controlled in accordance with the identified type. For example, when a finisher capable of stapling is connected to a printing apparatus, the staple setting item of the user interface of the printer driver is validated so that the user can set the staple.

Patent reference 2 describes a method of preventing bookbinding with contents different between the cover and the paper bundle in bookbinding processing. According to this method, printing information containing identification information of a cover and that of a paper bundle is printed by a printing apparatus. A bookbinding control apparatus loads the printed identification information and, if the identification information of the cover and that of the paper bundle coincide with each other, performs bookbinding processing.

When an in-line finisher is connected to a printing apparatus, a computer using the printing apparatus can control the printing apparatus including post-processing by the finisher.

In a system called "i2i" available from Horizon, setting information of a finisher is input by the user in accordance with the type and functions of the finisher and the like, and the setting information is saved in a control server which manages a printing job. An ID which links a loaded printed product to the setting information of the finisher is issued, printed, and attached to the printed product. The finisher reads the ID attached to the printed product by a reading device such as a barcode reader, and loads setting information corresponding to the ID from the control server. The finisher is automatically set in accordance with the loaded setting information.

[Patent Reference 1] Japanese Patent Laid-Open No. 2004-078449

[Patent Reference 2] Japanese Patent Laid-Open No. 11-105455

However, in patent reference 1 described above, the bookbinding apparatus is a so-called in-line finisher connected to a printing apparatus (the in-line finisher is a bookbinding apparatus which is mounted as an optional device in a printer, and connected to the printer via a paper convey path extending from the printer). The method in patent reference 1 cannot be applied to a bookbinding apparatus which is not connected to a printing apparatus via physically the same paper convey path. In patent reference 2 described above, the bookbinding apparatus is a so-called off-line finisher (bookbinding apparatus not connected to any network) which cannot communicate with a printing apparatus. The user must separately issue an instruction on printing contents from the server, an instruction to print an ID, and an instruction to the finisher, and various kinds of information cannot be unitarily managed. In the i2i system available from Horizon, a printed product is associated with finisher setting information, but no finisher feature information can be reflected in printing data.

In other words, in either of the above-mentioned systems, when a product printed by a printing apparatus undergoes post-processing by a finisher which is not connected to the printing apparatus via physically the same paper convey path, the printing apparatus and finisher must be individually set. In particular, no system is proposed which unitarily sets a finisher and printing apparatus by an information processing apparatus such as a computer for controlling the printing apparatus. It imposes a burden on the operator to maintain matching between the settings of the printing apparatus and finisher, decreasing the productivity of printing processing and generating a setting error.

SUMMARY OF THE INVENTION

The present invention has been made in consideration of the above situation, and has as its object to provide an information processing apparatus capable (along with a control method therefor and a printing system) of automatically making settings which match printing attributes, by the information processing apparatus for a finisher which is communicably connected to the information processing apparatus and is independent of a printing apparatus, thereby increasing the productivity of printing processing, and preventing generation of any setting error.

In order to achieve the above object, the present invention comprises the following arrangement.

An information processing apparatus which generates printing data to be printed by a printing device, and generates post-processing setting information subjected to post-printing processing by an independently communicable post-printing processing device comprises a loading unit which loads function information representing a function of the post-printing processing device, an identification unit which identifies a printing function processible by the printing device and a post-processing function processible after printing by the post-printing processing device on the basis of the function information loaded by the loading unit, a display control unit which displays a setting window for setting the printing function and post-processing function that are identified by the identification unit.

a printing data generation unit which generates printing data to be printed by the printing device on the basis of the printing function input via the setting window displayed by the display control unit, and a post-processing setting information generation unit which generates post-processing setting information subjected to post-printing processing by the post-printing processing device on the basis of the post-processing function input via the setting window displayed by the display control unit, wherein the printing data generated by the printing data generation unit is transmitted to the printing device, and the post-processing setting information generated by the post-processing setting information generation unit is transmitted to the post-printing processing device.

An information processing apparatus which is connected by communication to a printing device and a post-printing processing device comprises a printing information generation unit which generates printing information on the basis of printing setting information, a post-processing setting information generation unit which generates, on the basis of the printing setting information and function information that describes a function of the post-printing processing device, post-processing setting information that describes a post-processing content of the post-printing processing device and identification information of the post-printing processing device, and a transmission unit which transmits, to the printing device, both the printing information generated by the printing information generation unit and the post-processing setting information generated by the post-processing setting information generation unit.

A printing apparatus connected to a network comprises a reception unit which receives post-processing setting information set for a post-printing processing device, and a transfer unit which extracts, from the post-processing setting information, information to be set for a post-printing processing device connected via the network, and transfers the information to the post-printing processing device.

According to the present invention, settings which match printing attributes are automatically made for a post-printing processing device which is connected by communication to an information processing apparatus. The productivity of printing processing can be increased, and generation of any setting error can be prevented.

Further, the labor of inputting information on a newly connected post-printing processing device can be saved.

Since post-processing setting information issued from the information processing apparatus is transferred to the post-printing processing device via the printing device, the information processing apparatus need neither particularly generate nor transmit post-processing setting information for the post-printing processing device. Hence, programming of the information processing apparatus can be simplified, which contributes to reduction of program codes and a decrease in errors.

When a plurality of post-printing processing devices are available, a post-printing processing device designated on the basis of priority can be preferentially adopted. By changing the priority, the user can explicitly designate a post-printing processing device for use.

By preferentially using a post-printing processing device connected in line to the printing device, convey work of a printed product from the printing device to the post-processing device can be reduced, which contributes to savings in labor and an increase in productivity.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 5B is a view showing the structure of a bookbinding apparatus with a casing-in function serving as an example of an off-line finisher;

FIG. 7 is a view showing an example of describing the finisher profile of a bookbinding apparatus;

FIG. 8 is a view showing an example of describing the finisher profile of a cutting apparatus;

FIG. 10 is a table showing an example of a finisher management table;

FIG. 15 is a table showing an example of an updated finisher management table;

FIG. 24 is a view showing an example of job control information;

FIG. 31 is a table showing an example of a priority table;

FIG. 34 is a functional block diagram showing a printing control apparatus according to the present invention.

DETAILED DESCRIPTION OF THE PREFERRED EMBODIMENTS

First Embodiment

<System Configuration>

Figure 1:
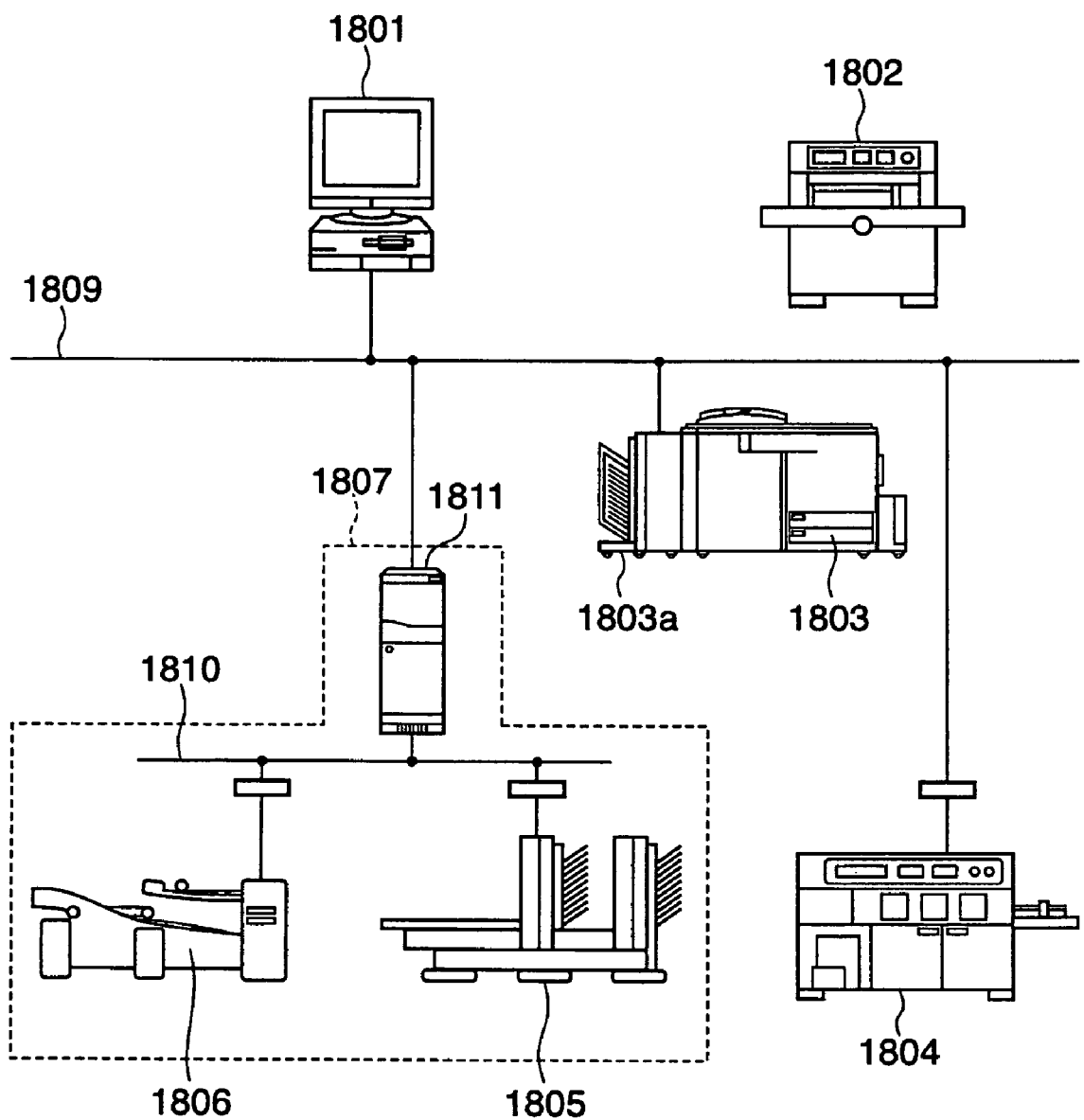
FIG. 1 is a view showing an example of a system configuration according to the present invention.

FIG. 1 is a view showing an example of a system configuration according to the present invention. A DTP (Desk Top Publishing) system in FIG. 1 comprises a client PC 1801, an image forming apparatus (printer or printing apparatus) 1803, an in-line finisher 1803a connected in line to the image forming apparatus 1803, a near-line finisher (bookbinding apparatus with a casing-in function) 1804 connected to a network 1809, an off-line finisher 1802 not connected to the network 1809, and a finisher system 1807. The finisher system 1807 can connect one or a plurality of finishers, i.e., a bookbinding apparatus 1805 with a saddle stitch function, a folding apparatus 1806, and a controller 1811 to a network 1810, and control them. A finisher connected to the network 1810 via the controller 1811 is also called a near-line finisher. Devices connected to the network can communicate with each other via the network. The printer 1803 comprises an image scanner, and is a multi-functional apparatus having not only a printing function but also scan, copy, facsimile communication, and filing functions. Thus, the printer 1803 is also called an MFP (Multi-Functional Printer). The client PC 1801 is an information processing apparatus, has a function of controlling a printer, and is also called a printing control apparatus when attention is paid to the printer control function.

An in-line finisher, off-line finisher, and near-line finisher will be explained in terms of the finisher control method.

An in-line finisher is a finisher which cannot singly communicate with a host computer and is connected to, e.g., an image forming apparatus via the same paper convey path. The contents of processing by the in-line finisher for a printed product conveyed from the image forming apparatus are set from the image forming apparatus. The processing contents are designated by post-processing setting information. A printing job containing designated processing contents (e.g., bookbinding processing) by the in-line finisher can be generated by setting the in-line finisher as an optional unit of the image forming apparatus by a printer driver which runs on the information processing apparatus.

An off-line finisher does not have any means for communicating with an external apparatus (offline), and the contents of processing by the finisher are set in the finisher irrespective of another apparatus. For example, the processing contents are set by the user from the operation unit of the off-line finisher, or by reading, by the reader of the finisher, printing information such as a barcode printed on paper subjected to post-processing.

A near-line finisher comprises a means for communicating with an external apparatus such as an image forming apparatus. The contents of processing by the finisher can be input from its operation unit, and also input as, e.g., a job ticket from another device such as a host computer via a network.

The features of each finisher will be described in terms of the convey path (paper path) of a printout product. These features are general ones and are described for easy understanding of the present invention, so the present invention is not limited to the following description. The in-line finisher is physically connected to an image forming apparatus to define one paper convey path. Paper printed out from the image forming apparatus is quickly sent to the finisher via the convey path (paper path). The off-line finisher is not physically connected to the image forming apparatus. Paper printed out from the image forming apparatus is temporarily stacked on a truck, tray, belt conveyor, or the like, and then set at the input portion of the finisher. As for the near-line finisher, similar to the off-line finisher, printed paper is temporarily stacked and then set at the input portion of the near-line finisher. As described above, the near-line finisher can receive processing contents (job ticket) via the communication means. The in-line finisher can also be equipped with a communication unit for communicating with an external device (host computer), can receive a post-processing instruction (job ticket) via the communication unit, and operate as a near-line finisher.

<Configuration of Image Forming Apparatus>

Figure 2:
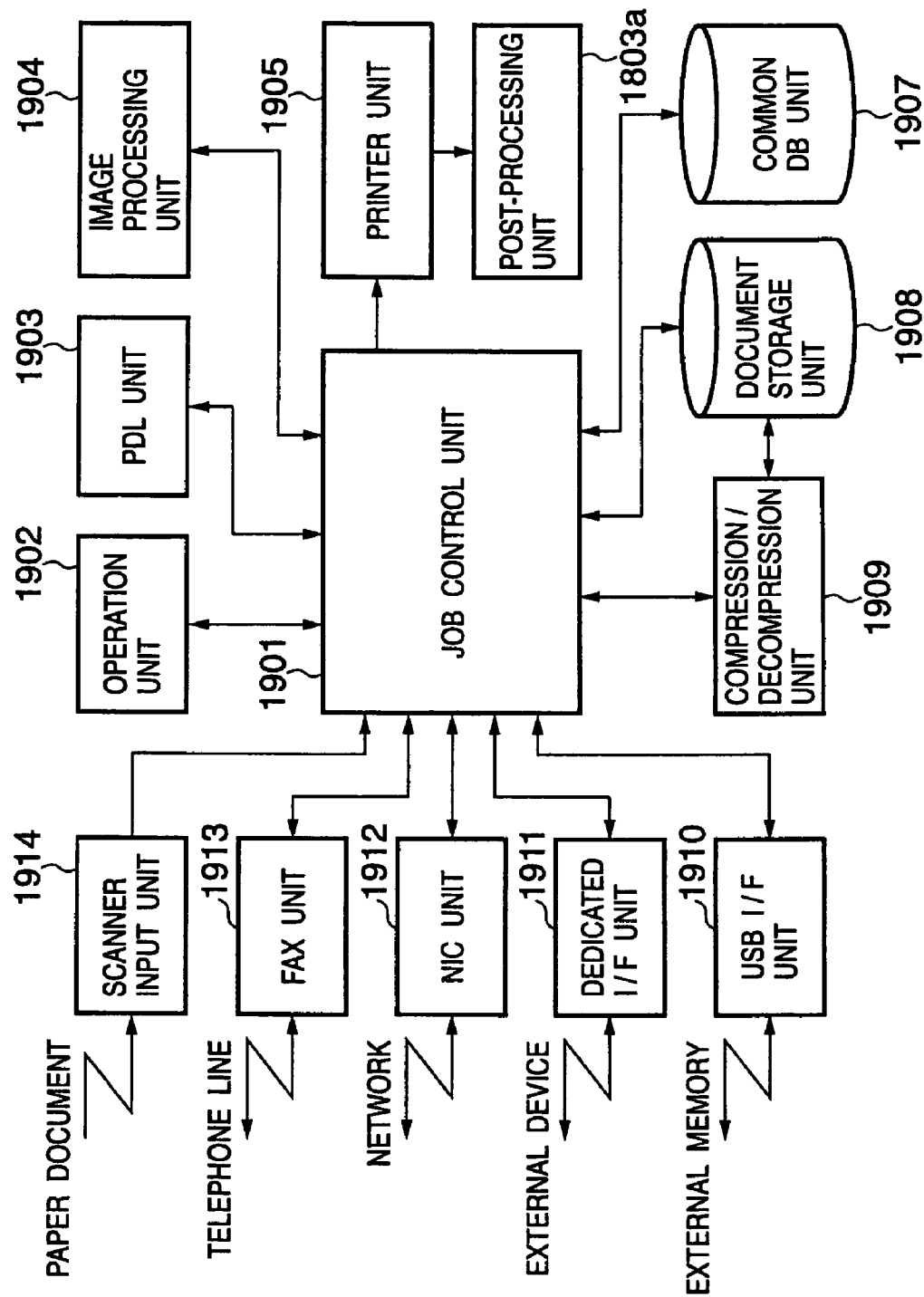
FIG. 2 is a block diagram showing an image forming apparatus.

FIG. 2 is a block diagram showing the image forming apparatus 1803 according to the present invention. As shown in FIG. 2, the image forming apparatus (printer) comprises a scanner input unit 1914, a FAX unit 1913, a NIC (Network Interface Card) unit 1912, a dedicated I/F unit 1911, and a USB I/F unit 1910. The scanner input unit 1914 includes a scanner unit which reads an image, and a scanner IP unit which processes image data. The FAX unit 1913 transmits/ receives an image by using a telephone line, which is typified by a facsimile apparatus. The NIC unit 1912 exchanges image data and apparatus information with a computer and the like via a network. The dedicated I/F unit 1911 exchanges information with an external device such as another image forming apparatus. The USB I/F unit 1910 is an interface with a computer or the like serving as a printing data transmitting side. In accordance with the use mode of the printer, a job control unit 1901 controls the whole image forming apparatus to, for example, temporarily save an image signal or determine a path. The job control unit can be implemented by arranging, e.g., a processor, RAM, and hard disk (not shown), and executing a predetermined program by the processor. The job control unit 1901 can further process image data. Image data includes image data from the scanner unit 1914, image data of a facsimile job input via the FAX unit 1913, image data input from an external apparatus (e.g., a computer) via the NIC unit 1912, and image data input from another image forming apparatus via the I/F unit 1911. These image data are temporarily stored in, e.g., the hard disk, then read out, transferred to an output unit such as a printer unit 1905, and printed by the printer unit. Needless to say, image data is not limited to bitmap data, and includes data which is so described as to render an image. For example, when PDL data is received, it is converted into data of a printable format by a PDL unit 1903, and undergoes necessary image processing by an image processing unit 1904. The processed data is printed by the printer unit 1905. The job control unit 1901 controls image data read out from the hard disk in accordance with an instruction from the operator so that the image data can be transferred to an external apparatus such as a computer or another image forming apparatus. A document storage unit 1908 can save and manage a document compressed by a compression/decompression unit 1909. An operation unit 1902 allows the operator to make settings of available finishers and the like. The available finishers are the post-processing unit 1803a, i.e., in-line finisher connected in line to the printer unit 1905, and the near-line finisher 1804 connected via the NIC unit 1912.

As described above, the image forming apparatus 1803 can set the in-line finisher 1803a and near-line finisher 1804 so as to use their functions. Finisher profiles (to be described later) which describe the functions of the finishers are profile information held in the image forming apparatus, and are transmitted to the computer 1801 so as to set functions for use by the computer on the basis of the profile information. The setting operation is done by the computer 1801 which reads out a finisher profile. The image forming apparatus acquires the finisher profile by saving, in the image forming apparatus, the profiles of all types of finishers which may be connected in shipping the image forming apparatus. When there is a near-line finisher 1804 which is newly supported by the image forming apparatus after shipping the image forming apparatus, the image forming apparatus acquires profile information (near-line finisher profile) in the near-line finisher 1804 after the new near-line finisher 1804 is connected to the network. Further, when no profile information is held in a finisher, or profile information is updated by changing or adding a function after installation, the profile information can be acquired from the Web page of the finisher manufacturer or the like. Hence, even if no finisher profile is held in shipping, the profile can be acquired in use. Note that profile information is information which describes the functional feature of a corresponding apparatus, and can also be called function information or feature information.

The image forming apparatus holds the finisher profile acquired by the above method in a common DB unit 1907.

Then, the acquired finisher profile is registered in the image forming apparatus so that the profile can be used from another device such as a printer driver. Details of registration will be described in the following chapter <Management of Finisher Profile>. After the end of registration, another device can utilize the finisher profile registered in the image forming apparatus via the NIC unit.

Note that the network in FIG. 1 is an IP network, and a connected device supports the IP.

<Hardware Configuration of Computer>

Figure 3:
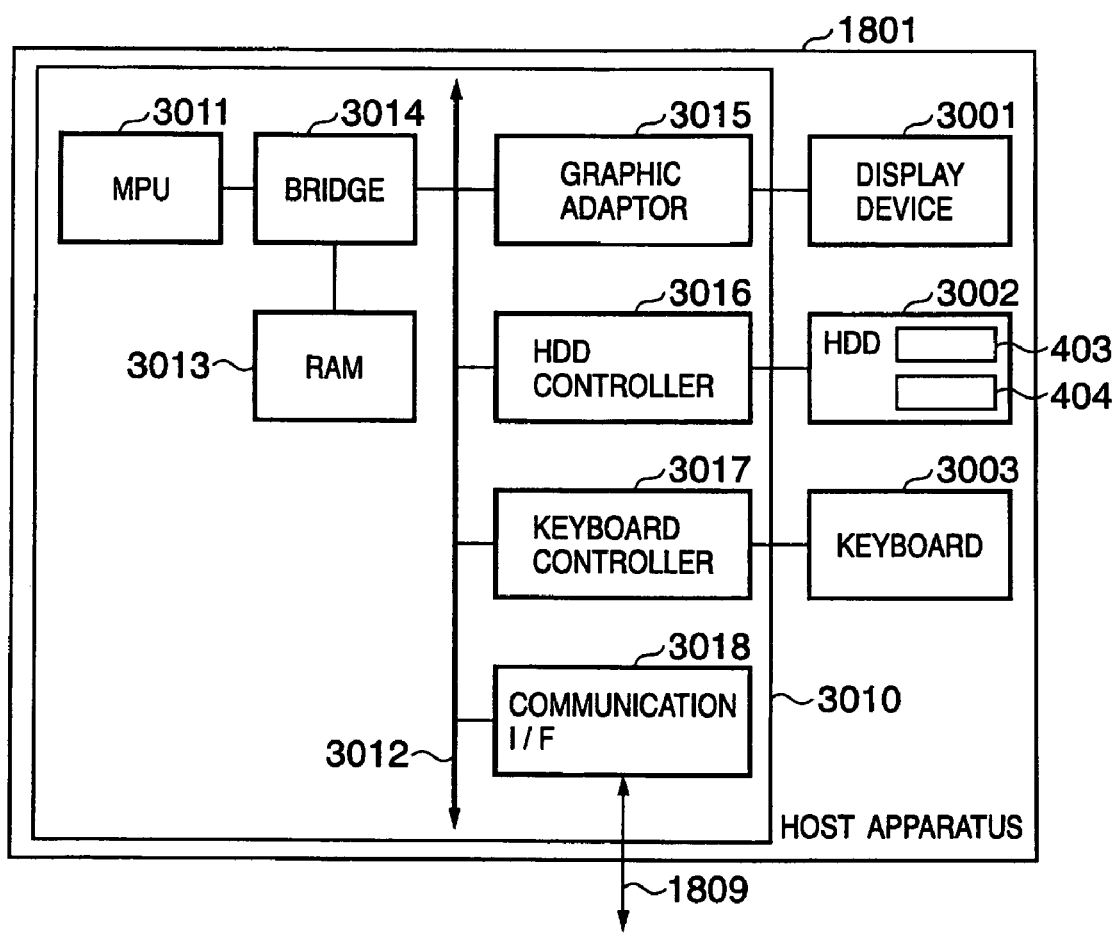
FIG. 3 is a block diagram showing a computer.

FIG. 3 is a block diagram showing an example of the configuration of the client computer 1801. As shown in FIG. 3, the client computer 1801 includes a processing unit 3010 and peripheral devices. The processing unit 3010 of the client computer 1801 comprises an MPU 3011 which controls the overall host apparatus in accordance with a control program, a bus 3012 which connects the building components of the system to each other, a RAM 3013 which stores programs, data, and the like executed by the MPU 3011, a bridge 3014 which connects a system bus, a memory bus, and the MPU 3011, and a graphic adaptor 3015 having a control function of displaying graphic information on a display device 3001 such as CRT.

The processing unit 3010 comprises an HDD controller 3016 which interfaces an HDD device 3002, a keyboard controller 3017 which interfaces a keyboard 3003, and a communication I/F 3018 serving as an interface with the network 1809 at the physical level and link level.

The display device 3001 (in this example, a CRT) which displays graphic information and the like for the operator is connected to the processing unit 3010 via the graphic adaptor 3015. Further, the keyboard 3003, and the hard disk drive (HDD) device 3002, serving as a large-capacity storage device which stores programs and data, are connected to the processing unit 3010 via controllers, respectively.

The HDD 3002 saves program files (e.g., an operating system, application, and printer driver), and data files (e.g., printer driver setting information 403 and profile information 404). The printer driver setting information 403 saves values representing the current settings of a printer available by the computer 1801. The profile information 404 saves the profile of an available peripheral device, in the first embodiment, profile information of a printer, near-line finisher, and the like. The profile information is information representing the features of a device such as the function of the device. More specifically, the profile information represents the functions (e.g., bookbinding function and cutting function) and capability of a near-line finisher. For example, as for the bookbinding function, the profile shows capabilities (e.g., the bindable position and size, the load weight, and the interval between staples) accompanying the bookbinding function. As for the cutting function, the profile shows capabilities (e.g., the cuttable paper size (maximum and minimum) and thickness) accompanying the cutting function.

The MPU 3011 executes a device driver, application program, and the like including the operating system and printer driver program. These programs sometimes display, on the display, UI windows for requesting the operator to intervene in processing, for example, set parameters or designate execution. The printer driver is prepared in accordance with the model of printer (including an MFP). The printer driver provides the operating system with information on the functions and configurations of a printer and the like, and executes processing for implementing a function unique to the printer model.

<Configuration of Near-Line Finisher>

Figure 5A:
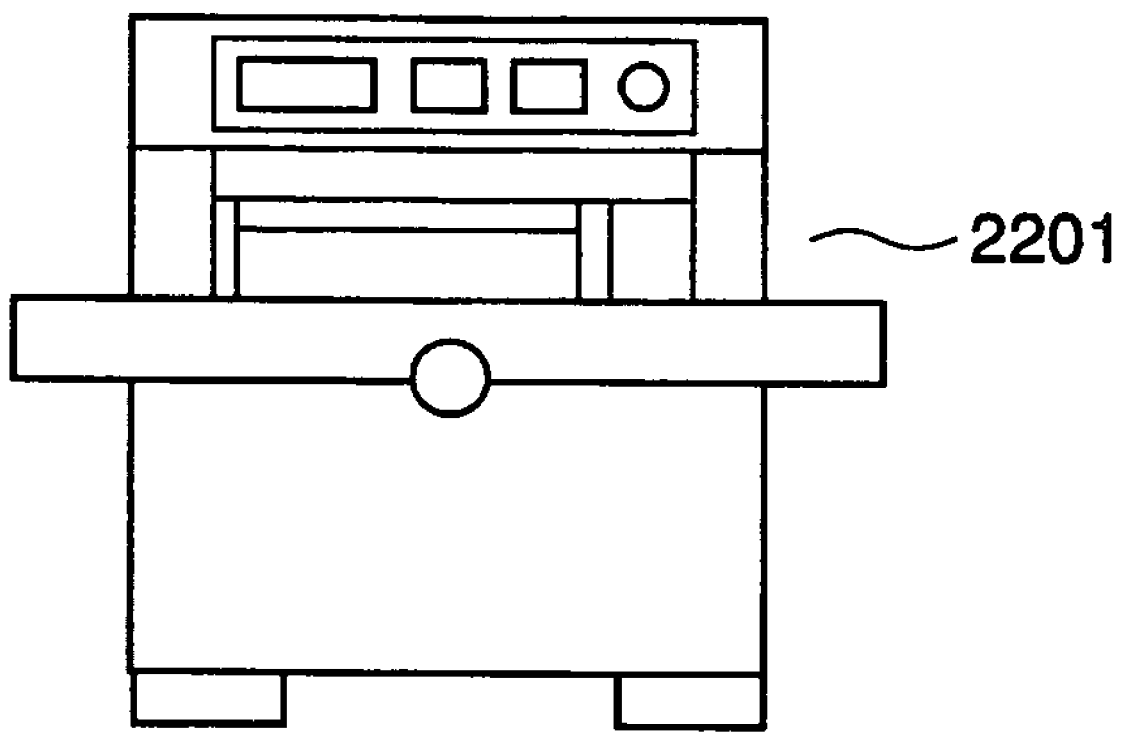
FIG. 5A is a view showing the structure of a cutting apparatus serving as an example of a near-line finisher.

Finishers are classified into various types by their functions. The first embodiment employs a bookbinding apparatus with the saddle stitch function as an example of an in-line finisher, a cutting apparatus 2201 in FIG. 5A as an example of an off-line finisher, and a bookbinding apparatus 2301 with the casing-in function in FIG. 5B as an example of a near-line finisher.

Figure 4:
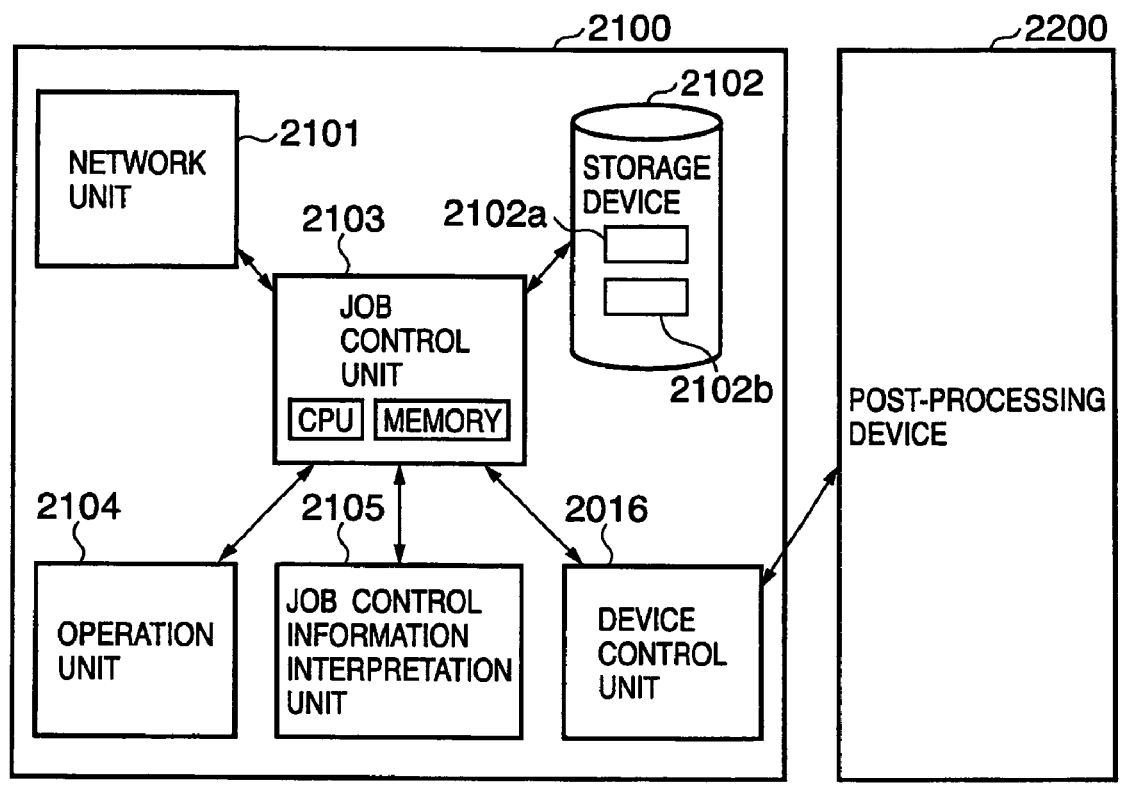
FIG. 4 is a block diagram showing the internal configuration of a near-line finisher.

FIG. 4 shows an example of the functional configurations of the near-line finishers 1804, 1805, and 1806. The near-line finisher comprises a post-processing device 2200 which executes post-processing such as folding or stapling for printing paper, and a controller 2100 which controls the post-processing device 2200. In the controller 2100, reference numeral 2101 denotes a network unit which communicates with another network device such as a host computer or MFP, and receives a job ticket (to be also referred to as Job control information) that describes a post-processing instruction. Reference numeral 2102 denotes a primary storage device (e.g., DRAM) or a secondary storage device (e.g., HDD) which temporarily saves information. Reference numeral 2103 denotes a control unit which controls a job in a near-line finisher and has a processor, memory, and the like. Reference numeral 2104 denotes an operation unit which accepts an ID input from the user. Reference numeral 2105 denotes a job control information interpretation unit which interprets input job control information and converts it into a format capable of controlling a device. Reference numeral 2106 denotes a device control unit which controls the post-processing device 2200. Job control information for controlling a finisher is also called post-processing setting information. The post-processing device 2200 is a processing mechanism which performs post-processing (post-press processing), and has hardware for implementing, e.g., the casing-in bookbinding function. These modules configure an in-line finisher.

The controller 2100 comprises a processor which has both a control program execution function and peripheral device control function and controls the whole finisher, a system bus which connects building components in the controller, a ROM which stores a control program executed by the processor, various data, and the like, and a RAM which saves a job ticket and the like. Profile information 2102a is saved in a ROM 3112 or the storage device 2102 such as a hard disk, and in this example, saved in the hard disk. The profile information 2102a is read (or written) by the image forming apparatus 1803 to allow the image forming apparatus to use the near-line finisher.

<Software Configuration of Computer>

Figure 6:
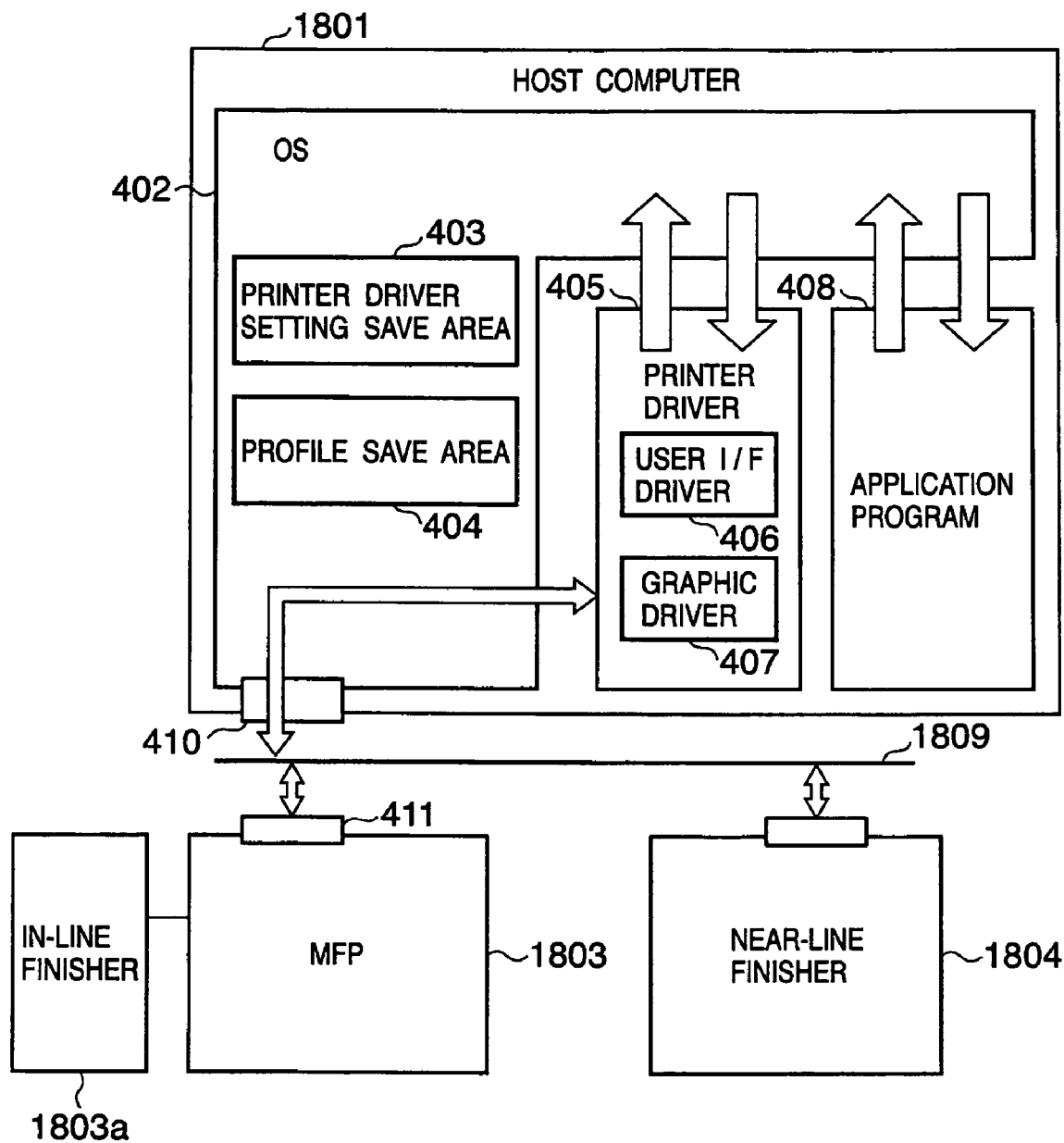
FIG. 6 is a block diagram showing the software configuration of a client computer.

FIG. 6 shows the configuration of software in a client computer containing a printer driver. An operating system (OS) 402 is installed in the client computer 1801. A printer driver 405 and application software 408 are installed on the OS 402 and controlled by the OS 402.

The printer driver 405 is formed from a user I/F driver 406 which displays a user I/F and saves settings, and a graphic driver 407 which converts a printing rendering instruction issued from the application 408 via the OS 402 into a code interpretable by the image forming apparatus. The user I/F driver 406 displays printing setting dialogs and property sheets shown in FIG. 18 to 20 when the application 408 permits the user via the OS 402 to set printing.

Note that the setting save area 403 for saving setting information set by the printer driver is ensured in a save area managed by the OS 402. Setting information containing printing attributes and post-processing instruction information which are set by the user via the user I/F driver is saved in the printer driver setting save area. The profile information 404 on available devices such as the MFP (printer) 1803 is also saved. The user I/F driver, graphic driver, and application software can access the printer driver setting save area via the OS to read printing attributes and post-processing instruction information which are set by the user.

The client computer is connected by connecting a communication I/F 410 on the client computer side and a communication I/F 411 on the printer 1803 side via a communication medium such as a network. The client computer is also similarly connected to another network device such as a finisher. The graphic driver 407 can transmit printing data to the image forming apparatus via the OS 402, and can also acquire the configuration information and status of the image forming apparatus and the like via the OS 402.

<Internal Structure of Profile>

In the first embodiment, a finisher profile (=finisher profile information) is described in the XML format. Finishers vary in type such as a bookbinding apparatus, cutting apparatus, and folding apparatus, and the functions of respective types are different from each other. Information greatly changes upon, e.g., adding a new function. In order to properly cope with various functions and changes, the profile is described using XML in a tag format. As a matter of course, the profile can be described in any format as far as addition of a new function and the like can be adaptively described. The finisher profile is prepared for each finisher device.

FIG. 7 shows an example of describing the finisher profile of a bookbinding apparatus, and FIG. 8 shows an example of describing the finisher profile of a cutting apparatus. In a "FINISHING" tag, "FinishingType" represents a type such as a bookbinding apparatus or cutting apparatus, "Manufacturer" represents a manufacturer name, and "ProductName" represents a model. FIG. 7 shows "bookbinding apparatus of 11ABC model available from ABC (Type: Bookbinding)". FIG. 8 shows "cutting apparatus of 10XYZ model available from XYZ (Type: Cutting)". Tags "Booklet" in FIG. 7 and "Cutting" in FIG. 8 describe functions unique to the respective models (bookbinding apparatus and cutting apparatus). In this manner, a function unique to each finisher can be individually defined by a tag and described as a profile.

For example, the "Booklet" tag of the bookbinding apparatus in FIG. 7 defines type names "saddle stitching fold", "flat stitching", "corner stitching", "half fold", "flat stitching fold", and "corner stitching fold". The "Medium" tag defines medium types "Plain" and "Fine", and medium weights "60 kg" as a minimum value and "120 kg" as a maximum value. The "StapleSpaceInterval" tag defines that the staple interval cannot be adjusted ("False") and the interval is 100 mm.

In FIG. 8, the "Cutting" tag describes that the maximum input dimensions (MaxInputDimensions) are 360 mm in breadth and length (X,Y). Also, the "Cutting" tag describes that the maximum output dimensions (MaxOutputDimensions) are 310 mm in breadth and length (X,Y), the minimum output dimensions (MinOutputDimensions) are 80 mm in breadth (X) and 150 mm in length (Y). Further, the "Cutting" tag describes that the maximum thickness (MaxThickness) is 70 mm.

In this way, finisher profile information defines the type of function, the manufacturer name, the model name, and the performance (e.g., dimensions and binding position) of each function. The profile information may be saved in, e.g., the storage device 2102 of the finisher, and read out and collected by the image forming apparatus, or directly collected from the near-line finisher under the control of the printer driver of an information processing apparatus serving as a host computer.

<Management of Finisher Profile by Image Forming Apparatus>

Figure 9:
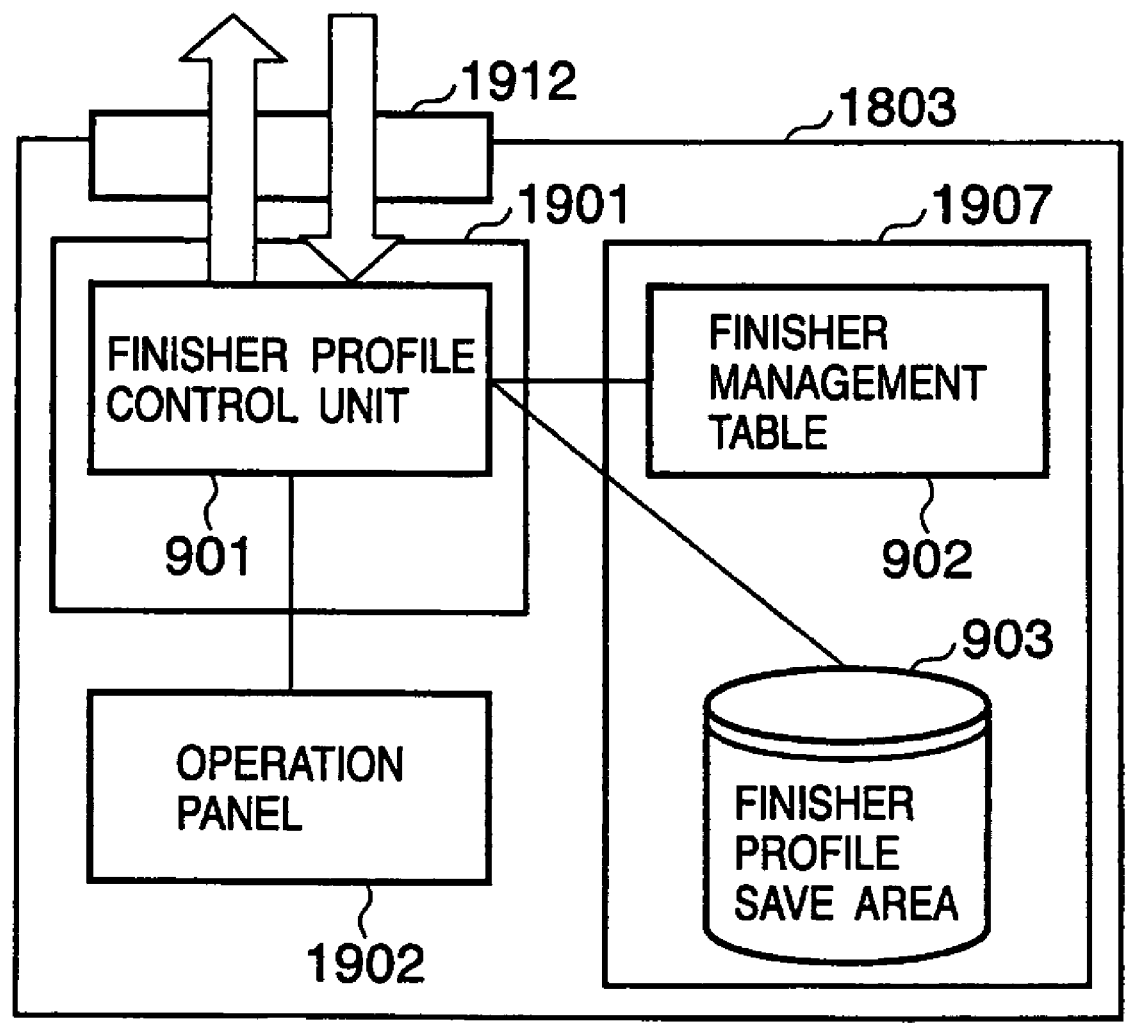
FIG. 9 is a block diagram showing the internal modules of the image forming apparatus.

FIG. 9 is a block diagram for explaining modules associated with a finisher profile in the image forming apparatus 1803. The image forming apparatus 1803 comprises the communication I/F (NIC) 1912 which communicates with the outside, a finisher profile control unit 901 which manages a finisher profile and transmits a profile in response to an external acquisition request, a finisher management table 902 which manages a finisher name, corresponding finisher profile name, connection status, and the like, and a finisher profile save area 903 which saves the entity (e.g., profile information shown in FIG. 7 or 8) of a finisher profile. Information such as the finisher name of a finisher connectable to the image forming apparatus is saved in the finisher management table 902, and profile information corresponding to each finisher is saved in the finisher profile save area 903. The finisher profile control unit 901 is one of the functions of the job control unit 1901, and the finisher management table 902 and finisher profile save area 903 are contained in the common database 1907.

FIG. 10 shows an example of the contents of the finisher management table 902. The table 902 stores information on a finisher connectable to the image forming apparatus. In the first embodiment, items of the table 902 are a management number 1002 (variable type is Unsigned Short), a finisher name 1003 (variable type is String), a manufacturer name 1004 (variable type is String), a file name 1005 of a corresponding profile (variable type is String), and a finisher connection status 1006 (variable type is Boolean: "false" represents that the finisher is not connected, and "true" represents that the finisher is connected). For example, in a column of management number #5, the finisher name is "Finisher-X", the manufacturer name is "XYZ", and the profile name of a corresponding profile is "finisher-x-of-xyz.xml". The connection status is "true" representing that the finisher is connected. Other columns can also be similarly interpreted. In this table, finishers except that of management number #5 are not connected.

<Connection Between Near-Line Finisher and Image Forming Apparatus>

Figure 16:
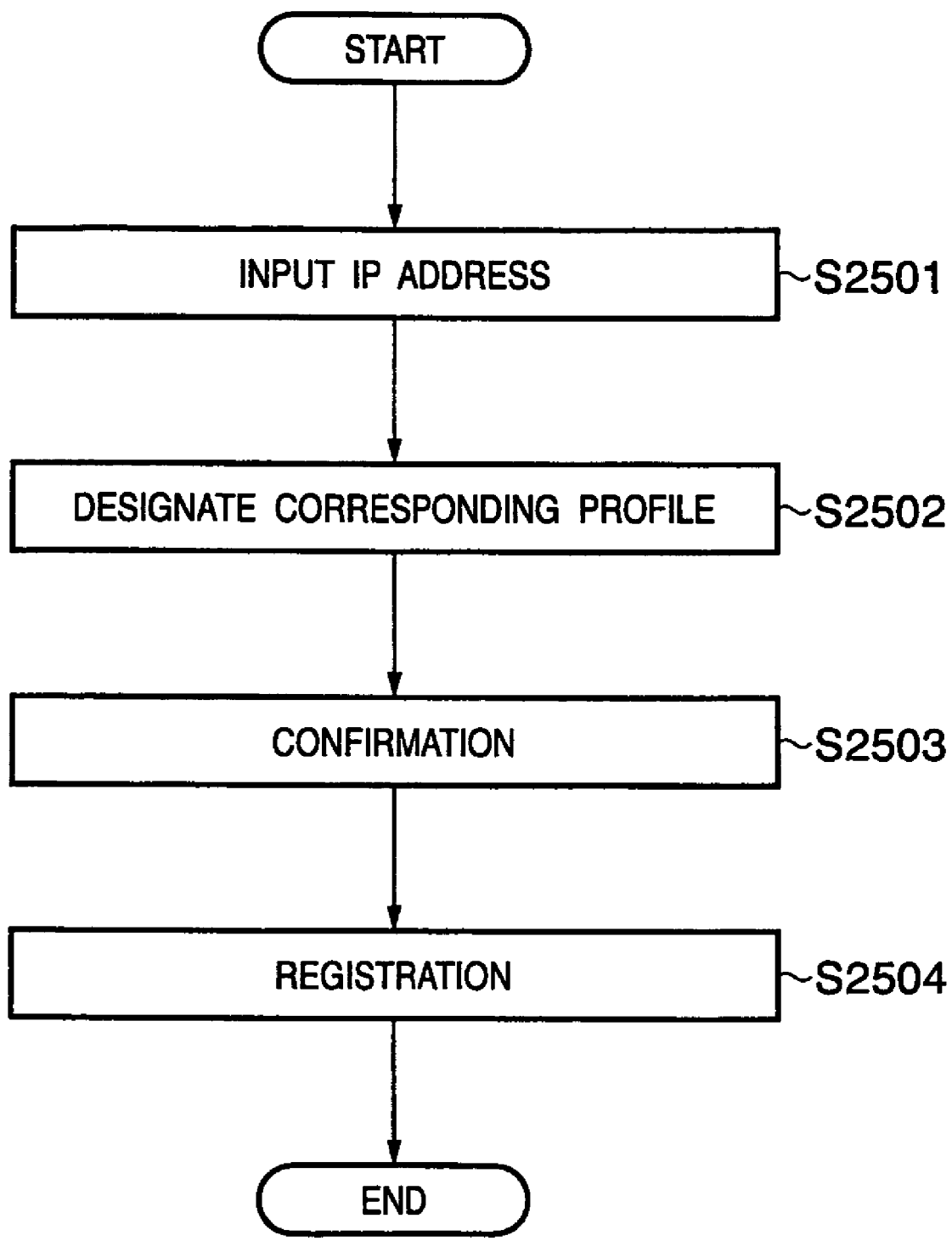
FIG. 16 is a flowchart showing registration of a near-line finisher in the image forming apparatus.

FIG. 16 shows a flow when the image forming apparatus acquires a finisher profile from a corresponding near-line finisher. That is, FIG. 16 shows procedures when a new finisher is added and registered in the finisher management table. This flow starts when the user designates "option" or "user mode" on the operation panel to change the window to a near-line finisher setting one.

In step S2501, the user inputs the IP address of a near-line finisher via the operation unit 1902. The IP address may be an IP address directly assigned to the near-line finisher, or the IP address of a predetermined subnet. In step S2502, on the basis of the input IP address, a finisher is specified from a finisher list stored in advance in the finisher profile save area 903 of the image forming apparatus, and a list of finishers connectable to the specified image processing apparatus is displayed. The user is prompted to select a corresponding finisher from a list of the manufacturers and models of near-line finishers in the displayed list, and designate a corresponding profile.

In step S2503, a display for prompting the user to confirm whether the finisher is correct is output. If a message that the user confirms that the finisher is correct is input to the display, profile information is requested of the finisher at the input address, and received and saved in step S2504. The finisher corresponding to the saved finisher profile is added to the finisher management table 902. The changed finisher management table is stored in a secondary storage device or nonvolatile memory.

As another example, when an ID representing a manufacturer and model can be acquired from a near-line finisher, an ID acquisition request is issued to an IP address after the user inputs the IP address of the near-line finisher. Then, the ID is acquired from the near-line finisher and displayed. If the user selects one of the displayed IDs of near-line finishers, profile information is requested of a finisher corresponding to the selected ID. Profile information can be acquired from a near-line finisher to rewrite the finisher management table. A finisher whose profile information can be acquired is one which is connected to a network and is available. In this fashion, a finisher profile is requested of a finisher at an input IP address, and acquired. The IP address of the finisher and profile information acquired from the IP address are saved in association with each other.

Figure 11:
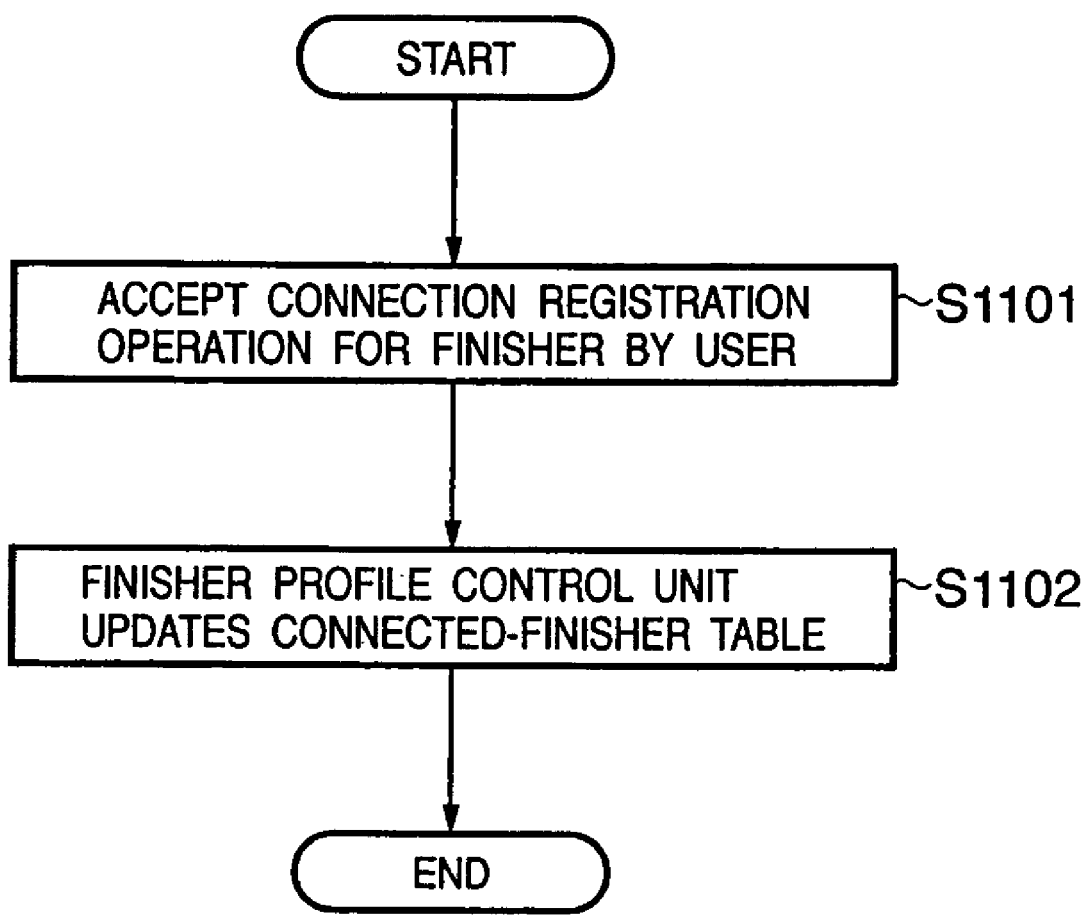
FIG. 11 is a flowchart showing procedures of connecting a finisher.

Procedures of allowing the image forming apparatus to use a registered near-line finisher will be explained with reference to the flowchart of FIG. 11. A near-line finisher which is made available is Finisher-Y available from XYZ. The user installs a new near-line finisher, and connects it to the image forming apparatus via a predetermined communication medium such as a LAN cable. The procedures in FIG. 11 are executed by the finisher profile control unit 901 of the image forming apparatus 1803, i.e., by the processor 1901 of the image forming apparatus 1803.

Figure 12:
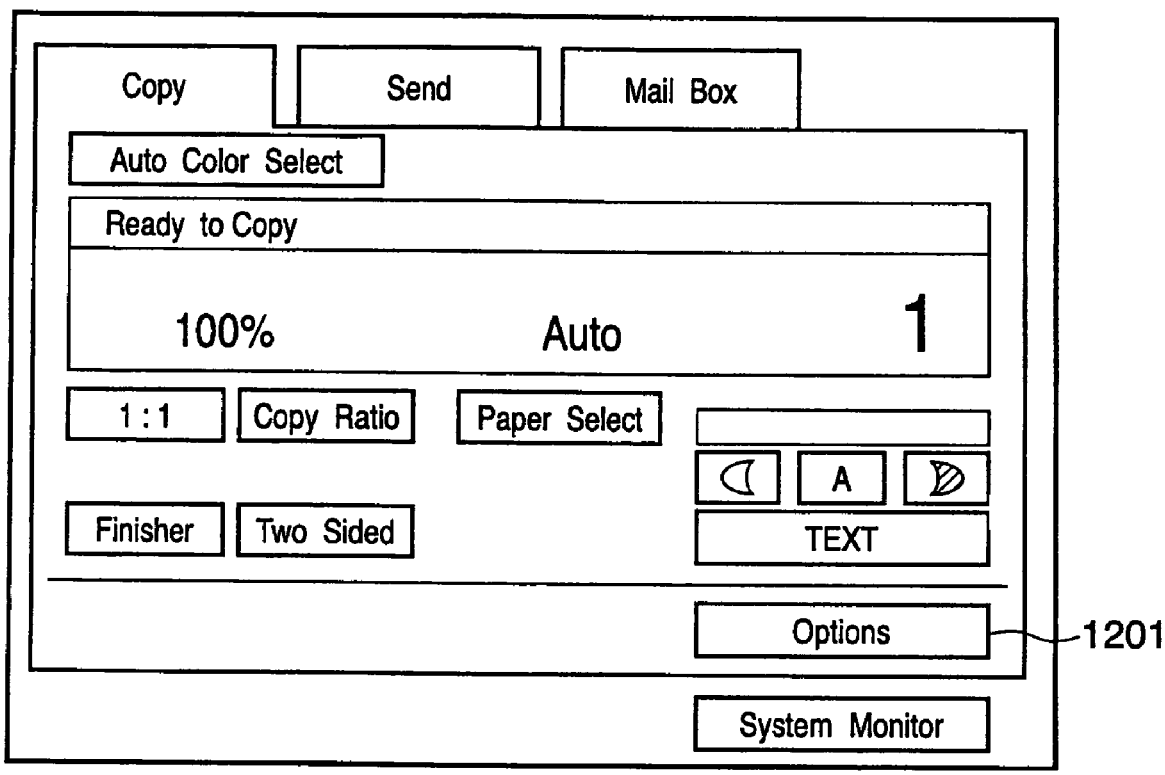
FIG. 12 is a view showing an example of the initial window of the operation panel of the image forming apparatus.
Figure 13:
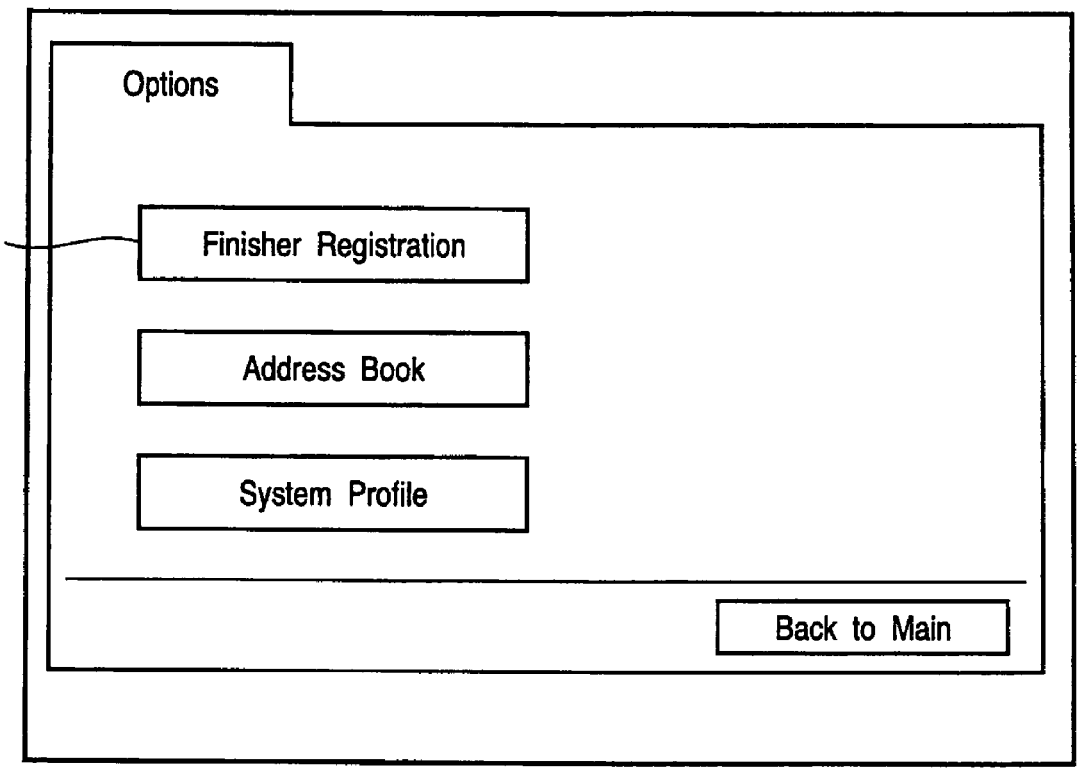
FIG. 13 is a view showing an example of the options setting window of the operation panel of the image forming apparatus.
Figure 14:
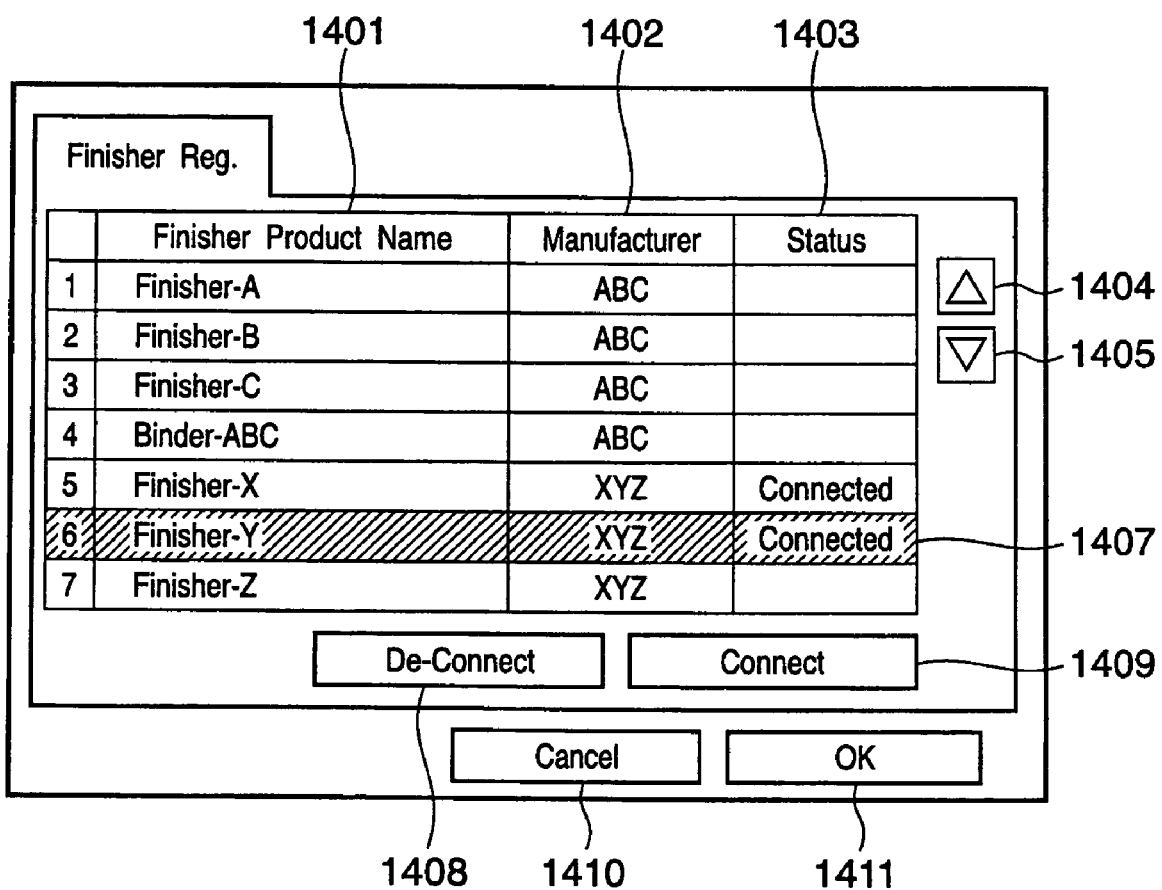
FIG. 14 is a view showing an example of the finisher registration window of the operation panel of the image forming apparatus.

In step S1101, the image forming apparatus 1803 displays a user interface window on the operation unit 1902 for the purpose of a connection operation by the user. In this window, the user performs a connection operation to a near-line finisher on the network, and issues an instruction to use the near-line finisher. If it is determined that the near-line finisher responds to this operation and is available, the connection state of the connected finisher is changed to "connected (true)" in the finisher management table in step S1102. This operation will be explained with reference to FIGS. 12 to 14. FIGS. 12 to 14 show operation windows in step S1101.

FIG. 12 shows the initial state of the operation panel of the image forming apparatus main body. In order to make connection setting of a near-line finisher, the user clicks an Options button 1201. This button is used to set options of the image forming apparatus, and clicked to display a window in FIG. 13. Then, the user clicks a "Finisher Registration" button 1301. By clicking this button, a finisher connection setting window in FIG. 14 is displayed. This window displays a list of registerable near-line finishers, and allows registering connection of each near-line finisher. The finisher list window in FIG. 14 is obtained by visualizing the finisher management table 902 except the corresponding profile name 1005. That is, the finisher list is made up of a finisher name 1401, manufacturer name 1402, and connection status 1403. This list shows seven finishers at once, and a button 1404 or 1405 for moving up or down the displayed list is clicked to browse finishers listed before and after the seven finishers. Connection registration or cancel of connection registration is done by touching any portion of a target finisher row and selecting the row. To register connection of the finisher, a "Connect" button 1409 is touched; to cancel connection registration, a "Disconnect" button 1408 is touched. In this case, in order to register connection of Finisher-Y available from XYZ, any portion of a row 1407 is touched to select Finisher-Y. In this state, the "Connect" button 1409 is touched to register connection of the finisher. In accordance with the touch of the "Connect" button 1409, the image forming apparatus 1803 issues a request (use request) to connect the near-line finisher.

If a response to the connection request is received, it is determined that the finisher can be used, and thus "Connected" is displayed. If no response is received, it is determined that the designated near-line finisher cannot be used, so no display is changed. Finally, an "OK" button 1411 is touched to validate the setting and return to the initial window of the operation panel of the image forming apparatus main body. To cancel the registration, a "Cancel" button 1410 is touched to cancel all contents operated in the window. In this case, updating of the finisher management table (to be described later) of the image forming apparatus is not executed.

A method (step S1102 of FIG. 11) of updating the finisher management table 902 by the image forming apparatus 1803 will be explained. Since the user connects and registers Finisher-Y available from XYZ in the finisher connection setting window of FIG. 14, the image forming apparatus 1803 updates the finisher management table 902. In the example of FIG. 14, the connection state column of management number #6 is rewritten from "false" to "true". FIG. 15 shows the finisher management table 902 after this update. As shown in a column 1601 of FIG. 15, the connection state of Finisher-Y in #6 is changed into "true".

By the above procedures, connection registration of the near-line finisher in the image forming apparatus is completed. In the first embodiment, connection of a near-line finisher is set by the user on the operation panel of the image forming apparatus after the near-line finisher is connected. However, connection can also be registered by another method as far as the finisher management table can be updated. For example, since the image forming apparatus and near-line finisher are connected via a communication medium, the protocol in connection is defined. The image forming apparatus and near-line finisher communicate with each other on the basis of this protocol, and the image forming apparatus automatically registers connection of the near-line finisher.

The image forming apparatus further executes steps of transmitting a finisher profile acquisition request to a connected near-line finisher, and receiving a finisher profile transmitted by the near-line finisher in response to the request. The received finisher profile is saved in the finisher profile save area 903. The name of the received finisher profile is registered in the finisher profile name 1005 of the finisher management table 902. The address of the finisher is registered in association with the finisher profile.

Figure 28:
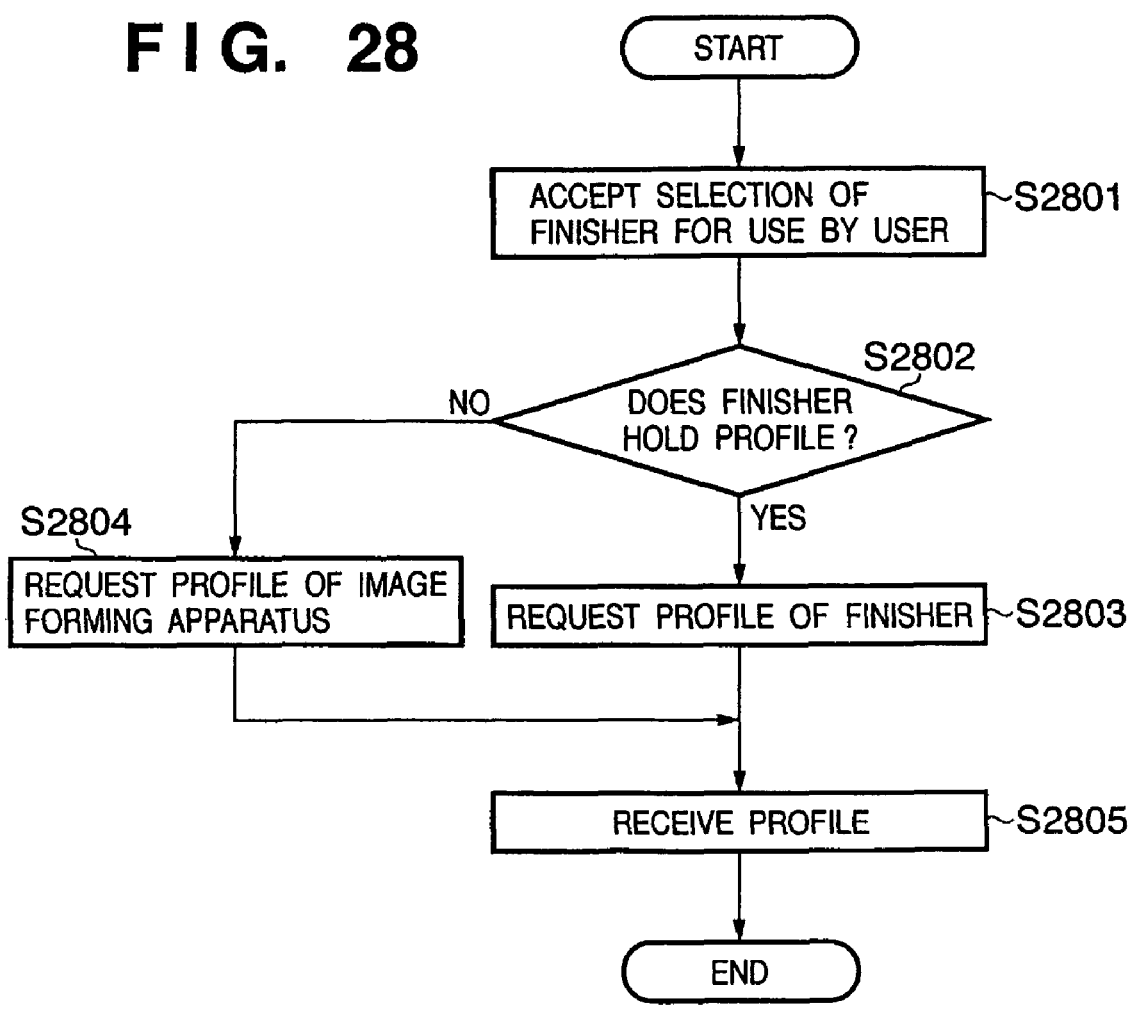
FIG. 28 is a flowchart showing acquisition of a profile according to the second embodiment.

Note that profile information of a near-line finisher is read from a registered near-line finisher by the image forming apparatus and then acquired by the computer. Alternatively, profile information can also be acquired directly from a near-line finisher by the computer, as shown in FIG. 28 (to be described later).

As for an in-line finisher, its finisher profile is initially stored in the image forming apparatus. If the in-line finisher is actually connected, a signal representing that the in-line finisher is connected is input to the control unit. This signal functions as a trigger, and, for example, a flag representing that the in-line finisher is connected is set. In other words, according to the first embodiment, an operation representing that an in-line finisher is registered or connected is not necessary for an in-line finisher.

<Acquisition of Finisher Profile>

Procedures of acquiring the finisher profile of a near-line finisher by the printer driver from the image forming apparatus and saving the finisher profile will be explained.

Figure 17:
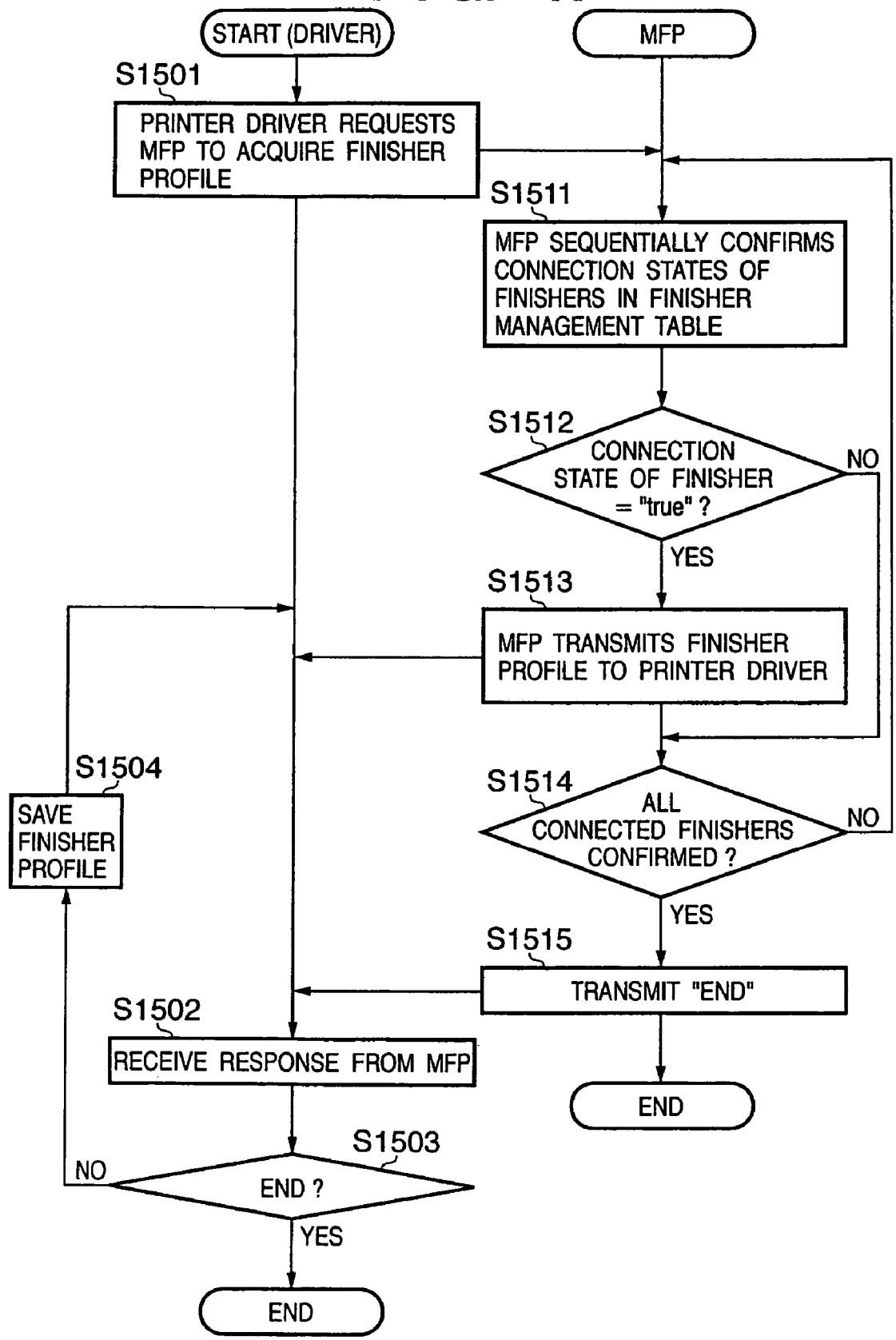
FIG. 17 is a flowchart showing a finisher profile acquisition method.

In the configuration of FIG. 6, the storage area 404 is a storage area (profile save area) in the OS where a finisher profile acquired by the printer driver 405 from the image forming apparatus is saved. The printer driver 405 activates a profile acquisition module via the API (Application Programming Interface) of the OS, uses the profile acquisition module to acquire a finisher profile from the image forming apparatus, and saves the acquired finisher profile in the profile save area 404. The profile acquisition module may be formed as one of the modules of the printer driver 405, or provided as one of the functions of the OS 402. In order to request and transmit a finisher profile, a communication medium is used between the communication I/F 410 on the host computer side and the communication I/F 411 on the image forming apparatus side. Note that the protocol used for communication is not particularly designated as far as acquisition of a finisher profile can be requested from the printer driver and the entity of the finisher profile can be transmitted. A method of acquiring a finisher profile by the printer driver from the image forming apparatus will be explained with reference to a flowchart. FIG. 17 is a flowchart showing this procedure. Processing in FIG. 17 is executed, for example, when the computer is powered on, when the user designates printing processing, or in accordance with an explicit instruction by the user.

In step S1501, the printer driver 405 requests the image forming apparatus 1803 to acquire the profile of a finisher which is connected to the image forming apparatus and registered. In response to the acquisition request from the printer driver, the image forming apparatus 1803 transmits a finisher profile saved in the finisher profile save area 903 to the host computer 1801 in which the printer driver runs.

Upon reception of the request, in step S1511, the image forming apparatus (MFP in FIG. 17) sequentially browses the finisher management table from the top, and confirms the connection state of each finisher, i.e., determines whether each finisher is connected. FIG. 15 shows a finisher management table held in the image forming apparatus. In the first step, the image forming apparatus confirms the connection state of "Finisher-A" on the top row. In this table, the connection state of the finisher is "false" representing that the finisher is unavailable. In step S1512, the condition of the connection state is determined. Since the connection state of "Finisher-A" is "false", the flow advances to step S1514. In step S1505, it is determined whether all finishers have been determined. If all finishers have not been determined, the flow returns to step S1511. This step is similarly repeated for "Finisher-B", "Finisher-C", and "Binder-ABC".

In step S1511, the connection state of "Finisher-X" serving as the next entry is determined. Since the connection state of "Finisher-X" is "true" representing that "Finisher-X" is available, the flow advances to step S1513 after condition determination in step S1512. In step S1513, the image forming apparatus transmits, to the printer driver, the finisher profile of each finisher (i.e., finisher of interest in the finisher management table) which is managed in an available status. For this purpose, the image forming apparatus reads a corresponding finisher profile name "finisher-x-of-xyz.xml" from the finisher management table 902. A file of this file name is extracted from a finisher profile save area 905, and transmitted to the printer driver (S1513). In step S1514, it is determined whether all finishers have been determined. If all finishers have not been determined, the flow returns to step S1511. For the next "Finisher-Y", the same steps as those for "Finisher-X" are done. Since the connection state is "true" in step S1512, the profile name "finisher-y-of-xyz.xml" of the finisher is loaded in step S1513. The image forming apparatus extracts a finisher profile of this name from the finisher profile save area, and transmits the finisher profile to the printer driver (S1513). This step is repeated for all finishers registered in the finisher management table. After the final finisher in the finisher management table is determined, the image forming apparatus transmits, to the printer driver in step S1515, information representing that all finishers have been determined. Then, the processing in the flowchart of FIG. 17 ends.

The printer driver receives a response from the image forming apparatus (S1502), and determines whether the response contents represent "end" (S1503). If the response contents do not represent "end", the received data is a finisher profile, and is saved in the save area (S1504). In this way, the printer driver acquires the finisher profile of a connected (available) near-line finisher from the image forming apparatus.

Note that the profile of an in-line finisher can be acquired similarly to a near-line finisher. Since in-line finishers connectable to the image forming apparatus are limited, the profiles of all in-line finishers may also be saved in advance in the image forming apparatus. In this case, an activation flag or the like is associated with the profile of an actually connected in-line finisher, and the connection is presented. In processing for finisher setting or the like, an activated in-line finisher is an available finisher.

<User Interface of Printer Driver>

Figure 18:
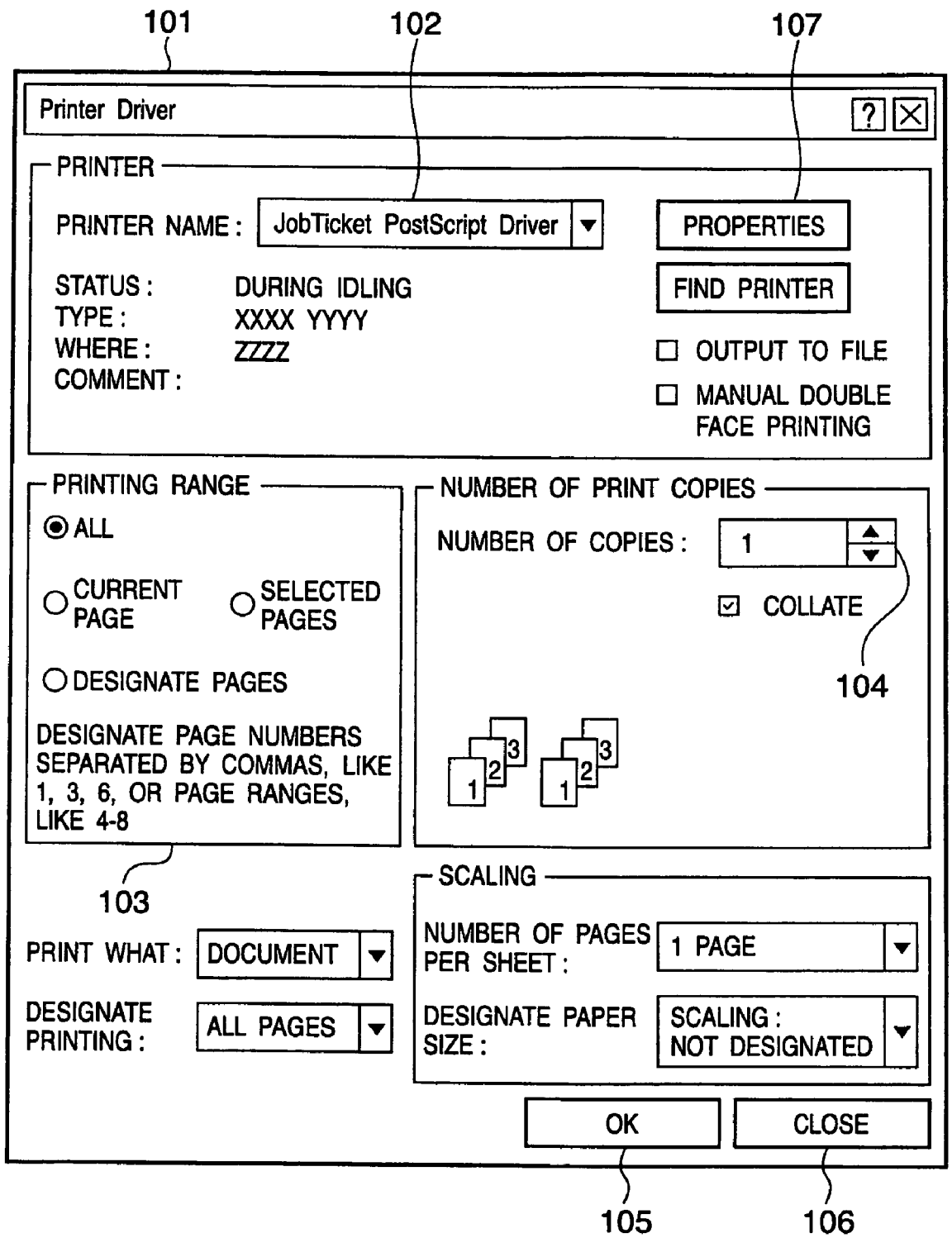
FIG. 18 is a view showing an example of the dialog of a printer driver.
Figure 19:
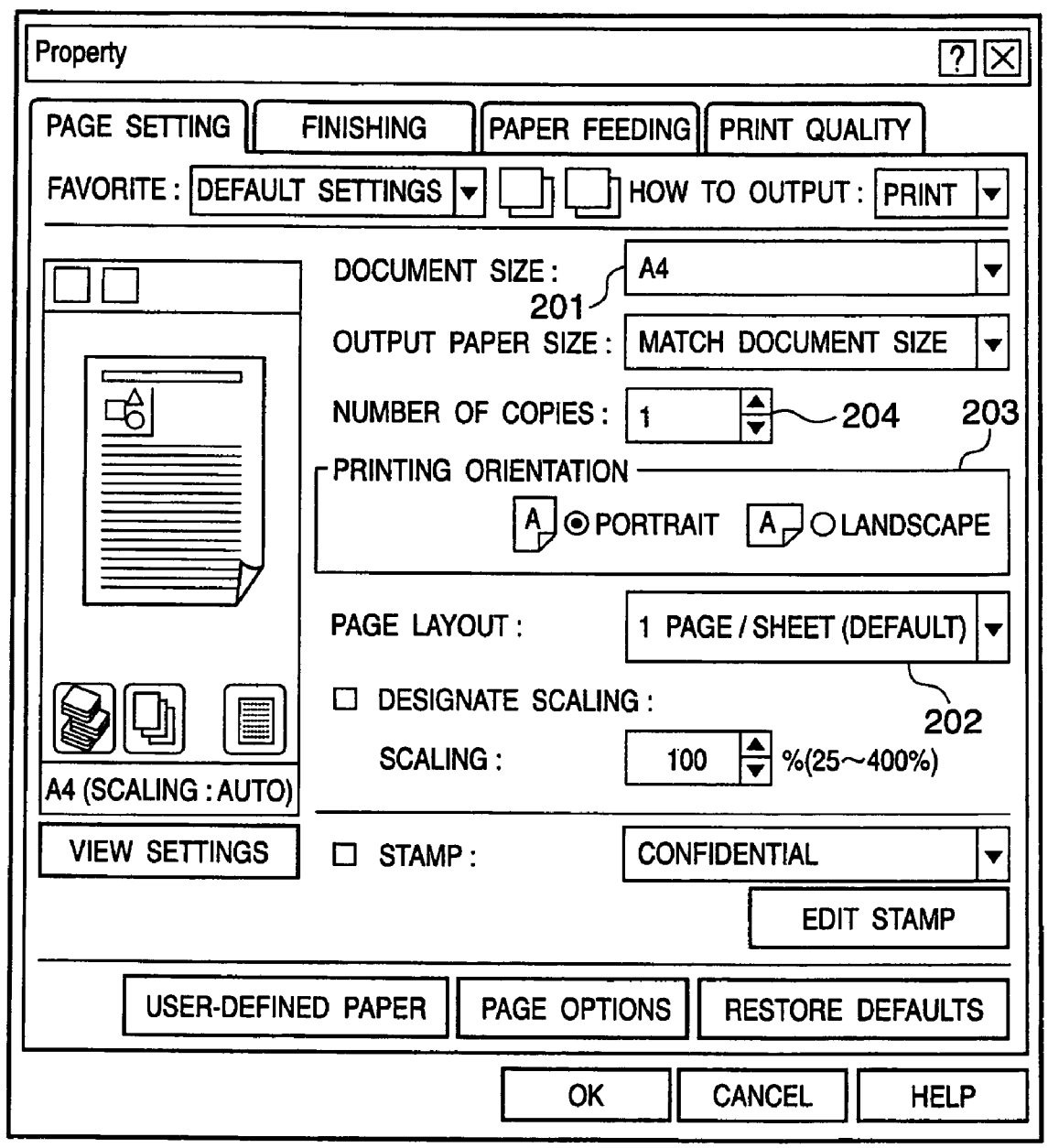
FIG. 19 is a view showing an example of the page setting property sheet of the printer driver.
Figure 20:
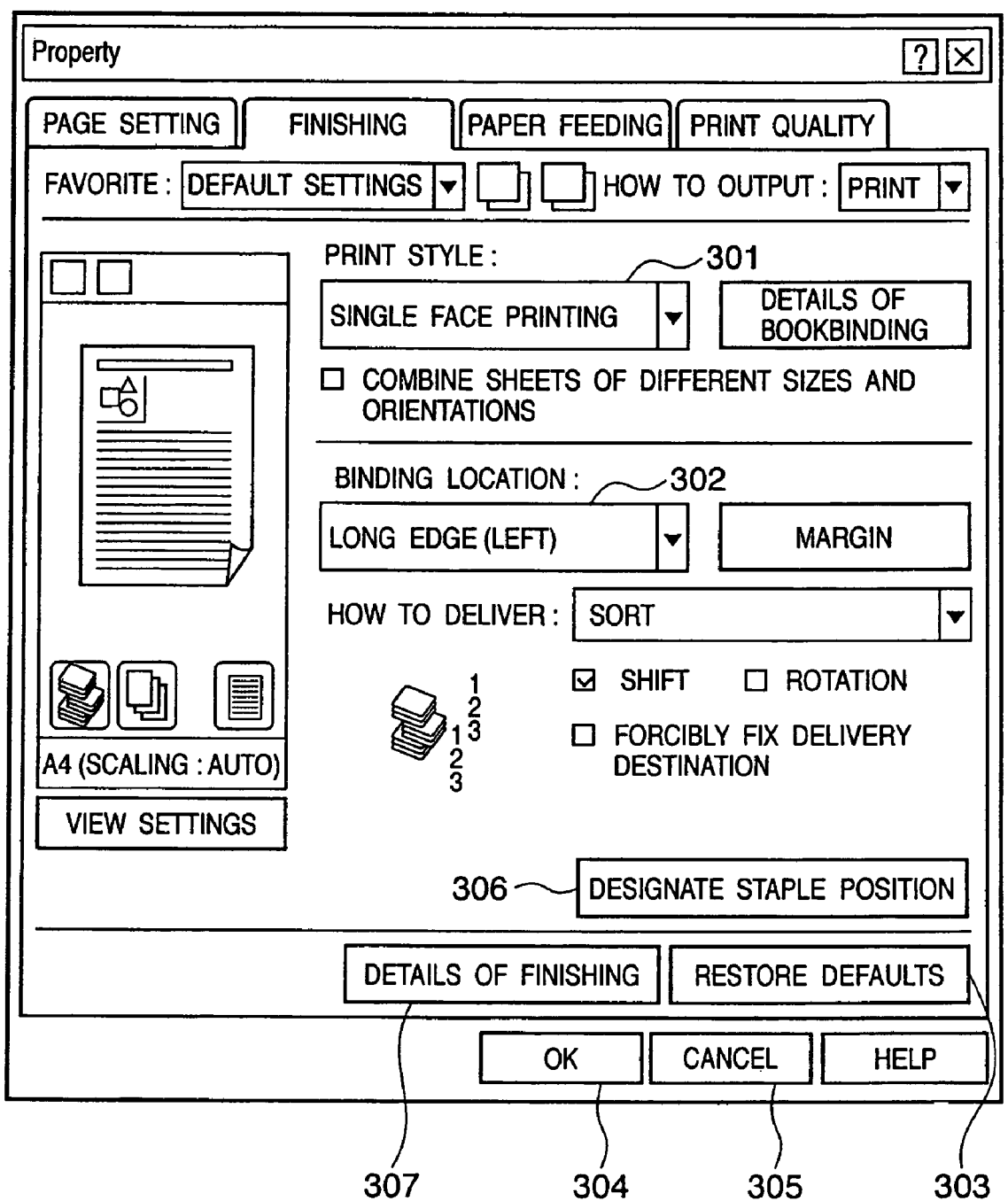
FIG. 20 is a view showing an example of the finishing property sheet of the printer driver.

FIGS. 18 to 20 are views showing examples of user interface windows (to be also referred to as printer driver windows hereinafter) provided by the printer driver. Note that operations and controls to be described with reference to FIGS. 18 to 20 are also incorporated as part of the present invention. The printer driver can display a GUI (Graphical User Interface) having a display window structure suitable for designating an output operation (e.g., printing operation) by the image forming apparatus (e.g., MFP or printer) of the system. A printing setting GUI displayed on the computer display when the user designates printing by a key operation is displayed from the operation window of an application or the like. The GUI has a field for displaying and designating the properties of "printer". When the user operates this field, a GUI for displaying and changing printing settings is further displayed. FIG. 18 shows an example of this GUI.

On the GUIs of FIGS. 18 to 20, the user can perform an operation to set desired setting parameters (printout processing condition data). In accordance with input printing setting information, the printer driver generates, from designated data such as an image, printing data corresponding to a transmission destination (also called an output destination) such as a printer. The generated printing data is transmitted as a printing job by the operating system to the destination device via a network or the like.

In FIG. 18, reference numeral 101 denotes a printer driver window. Among setting items in the printer driver window 101, reference numeral 102 denotes a transmission destination selection box for selecting a target output destination. The user can select a desired output destination device of the system via the selection box 102 displayed in the window.

Reference numeral 103 denotes a page setting field for selecting an output page from a printing job. In the field 103, it is set which page is output among data of a plurality of pages that are created by application software running on the client computer and are to be printed. The user can select a page to be printed out by a device such as the image forming apparatus of the system via the page setting field 103 displayed in the window. The user can print all pages, or specific pages without printing all pages.

Reference numeral 104 denotes a copy count setting box for designating the number of output copies of a job to be printed out by the image forming apparatus of the system. The cursor is moved to the position of the box 104, and an arrow (arrow of the scrollbar) shown in FIG. 18 is clicked to increment/decrement the number of copies. Reference numeral 107 denotes a property button for making detailed settings of a transmission destination device selected in the transmission destination selection box 102. In response to the button 107 input by the user, the printer driver controls to display various detailed windows shown in FIGS. 19 and 20 on the computer display.

If the user clicks an OK button 105 after making desired settings via various operation windows in FIGS. 18 to 20, printing can start in accordance with settings desired by the user. In order to cancel the processing, the user clicks a cancel button 106. In response to this, the control unit cancels printing, and ends display of the window 101.

FIGS. 19 and 20 show operation windows (GUIs) displayed on the client computer screen in response to a click of the property button 107 by the user in the operation window shown in FIG. 18.

This window has sheets "page setting". "finishing", "paper feeding", and "print quality", and tabs for selecting the respective sheets. The user clicks these tabs (with the operation unit (e.g., pointing device: not shown) of the client computer), and can make settings of various detailed different printout conditions such as settings associated with "page setting", settings associated with "finishing", settings associated with "paper feeding", and settings associated with "print quality".

FIG. 19 shows an example of an operation window (page setting sheet) displayed when the "page setting" tab is clicked. This window includes a paper size setting box 201, imposition layout setting box 202, paper orientation setting box 203, copy count setting box 204, and the like. The paper size setting box 201 is a field for allowing the user to set the paper size of printing paper for a job to be printed. The imposition layout setting box 202 is a field for inputting an instruction to select a layout mode in which document image data of a plurality of pages are laid out and formed on the same plane of one printing sheet. The imposition layout setting box 202 is also a field for selecting, from a plurality of candidates, the number of pages whose images are to be laid out and formed on the same plane of one printing sheet in the layout mode. The paper orientation setting box 203 is a field for prompting the user to select the orientation of paper to be printed from a plurality of selection candidates such as portrait and landscape. The copy count setting box 204 is a field for prompting the user to select the number of print copies of a job to be processed. The user can input desired printing settings in the respective setting item fields (boxes) of the user interface window.

When the "finishing" tab is selected by a key operation by the user and a plurality of finisher profiles are held, the printer driver 405 (i.e., control unit 3010) displays a finisher selection window (not shown) in order to select one of finishers. When a finisher is selected from the finisher selection window, the printer driver loads profile information of the selected finisher, and displays an operation window as shown in FIG. 20 on the display unit in accordance with the loaded profile information. This window is used to set setting information unique to a device selected by the user in the operation window of FIG. 18 from devices of the system. The setting information includes settings for sheet processing, and the settings for sheet processing include setting of stapling processing, that of sorting processing, that of punching processing, and that of bookbinding processing. In addition, the setting of which of single or double face printing is executed, and the setting of finer adjustment associated with image processing for changing parameters such as the color tint by a printer and the like can also be done. These detailed settings can be made by the user via a plurality of setting windows (setting fields) executable by the user. Assume that a double face printing mode is set by the client via a printing method setting box 301 in the operation window of FIG. 20, and long-edge binding is set via a binding direction setting box 302. In this case, the image forming apparatus is controlled by the printer driver so that an image forming apparatus selected by the user in the operation window of FIG. 18 is controlled to execute double face printing processing in accordance with the settings "double face printing" and "long-edge binding". When post-processing (e.g., casing-in bookbinding) by a near-line finisher is designated as post-processing for a printed product, the post-processing is done by two processing methods. According to the first processing method, the printer driver transmits, to the image forming apparatus, a printing job containing job control information which describes the contents of post-processing by the near-line finisher and the ID of the near-line finisher. According to the second processing method, the printer driver generates a job ticket which describes the contents of post-processing by the near-line finisher and a job ID (identifier), and outputs the job ticket to the near-line finisher separately from job control information. When the user operates a default button 303 in the operation window of FIG. 20, the printer driver controls to restore detailed printing settings in the operation window of FIG. 20 to default values.

Although not shown, the "print quality" tab similarly makes it possible to select the resolution, halftone setting, and the like.

If an OK button 304 is clicked (designated), property settings are validated, and the window returns to the window of FIG. 18. If a cancel button 305 is clicked (designated), property settings are invalidated, and the window returns to the window of FIG. 18.

Of printing processing conditions including various detailed settings, the client sends printing condition data set via various printing setting windows of FIGS. 18 to 20 together with a job output request and image data of the job from the client computer. As a result, an image forming apparatus selected by the client can be controlled to output data selected by the client in accordance with output settings made by the client.

Note that items displayed on the "finishing" sheet after a finisher is selected are based on the printer profile of the image forming apparatus itself and a finisher profile selected from finisher profiles acquired from the image forming apparatus by the procedures of FIG. 17. More specifically, the "finishing" sheet shows items corresponding to the functions of a finisher which is selected from a selected near-line finisher and an in-line finisher connected to the image forming apparatus. These items are given predetermined default values. For example, when the finisher profile in FIG. 7 is held, a "designate staple position" button 306 on the user interface of FIG. 20 is activated. When the button 306 is clicked by the operator, a selection menu field for selecting the binding method is displayed. In this menu field, six binding methods defined in the "BookletType" tab in the profile of FIG. 7 are provided as selection candidates. The cutting size and the like contained in the profile of FIG. 8 can be set by clicking, e.g., a "details of finishing" button 307 in FIG. 20 and displaying the size after cutting.

<Printing Processing by Host Computer>

Figure 21:
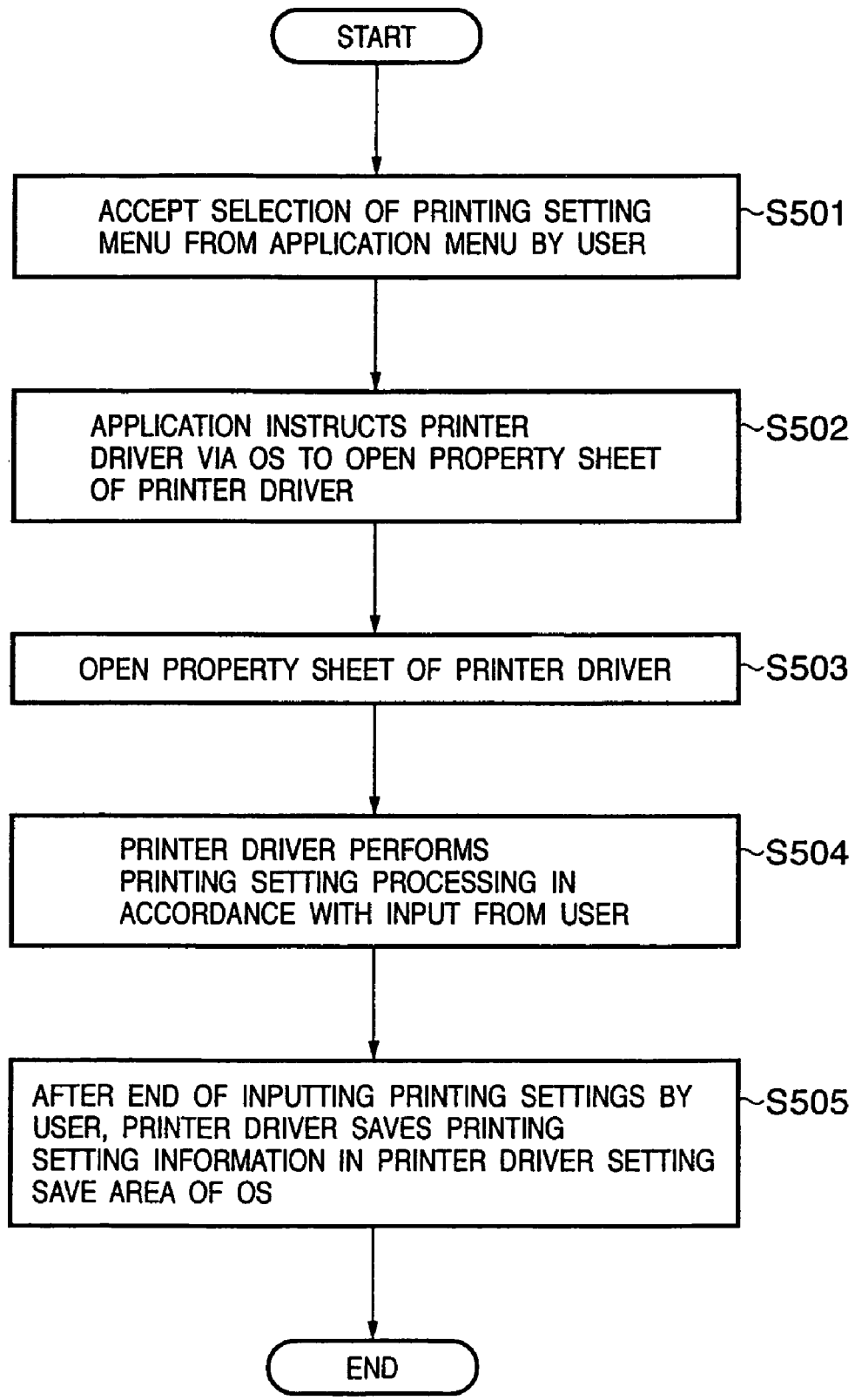
FIG. 21 is a flowchart showing printing setting.
Figure 22:
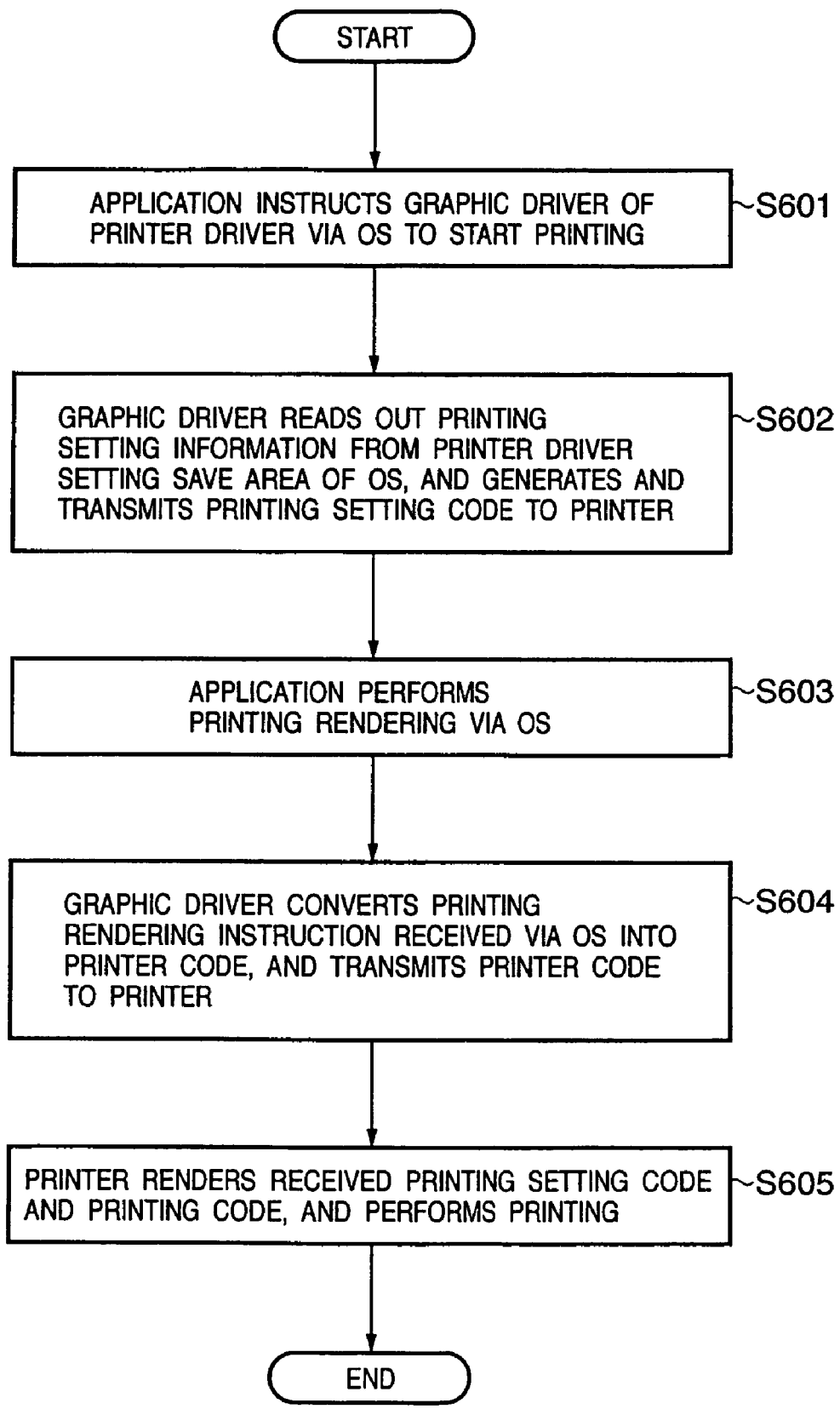
FIG. 22 is a flowchart showing printing.

The flow of setting printing attributes by the user on the printer driver and printing out will be explained with reference to the flowcharts of FIGS. 21 and 22 and the user interface windows of FIGS. 18 to 20. FIG. 21 is a flowchart showing procedures of inputting printing setting information by the user, and FIG. 22 is a flowchart up to printing after the user designates printing.

In setting printing, an input to select a printing setting menu from the menu of application software is accepted from the user in step S501. In step S502, the application program calls the API (Application Programming Interface) of the OS, and instructs the printer driver to display a printing setting property sheet. In response to this instruction, the OS instructs the printer driver to display the printing setting property sheet. In step S503, the printer driver (especially a user I/F driver serving as part of the printer driver) accepts this instruction, and displays the printing setting property sheet shown in FIG. 18. Subsequently, in step S504, the user makes desired printing settings on the above-described property sheets in FIGS. 18 to 20. The printer driver temporarily saves setting values in accordance with a setting operation. If the user clicks the OK button of the property sheet in FIG. 18, the printer driver finalizes the set printing setting information. In response to the click of the OK button, in step S505, the printer driver (user I/F driver) calls the API of the OS, and saves the printing setting information values set by the user in the printer driver setting save area 403 in the OS. As a result, input and saving of the printing setting information are completed.

In order to print a document, the user selects a printing menu from the menu of the application software. In response to the selection instruction, in step S601, the application software calls the API of the OS, and instructs the printer driver to start printing. In response to the printing instruction, the OS instructs the printer driver to start printing. In step S602, the graphic driver which forms the printer driver reads out the saved printing setting information from the printer driver setting save area 403 of the OS, and generates job control information to the image forming apparatus and job control information for designating finishing settings to a selected finisher. The printer driver generates a printing job containing the generated job control information and transmits the job to the image forming apparatus (first processing method), or transmits the printing job and a job ticket of the job control information to the image forming apparatus and selected finisher, respectively (second processing method). The job control information contains, e.g., a JDF (Job Definition Format) command, PJL (Print Job Language) command, and PDL (Page Description Language) command. The JDF is an abbreviation of an XML-based file format which is defined to comprehensively define, describe, manage, and control all steps of creating and forming a printed product. In the first embodiment, data of the JDF format will be simply called a job ticket. The PJL is a general language for processing data described in the PDL as a printing job. In this example, the JDF is used as job control information. When a selected finisher is a near-line finisher, a job ticket is transmitted as job control information to the near-line finisher. When a selected finisher is an in-line finisher, the PJL in the printing job or job control information described in the PDL is transmitted to an image forming apparatus connected to the in-line finisher. When a selected finisher is an off-line finisher, a printing job is generated by converting the contents of job control information into a format which can be read by the user and can be input to the off-line finisher. Then, the printing job is transmitted to the image forming apparatus. When the transmission destination is a near-line finisher, the destination address is an IP address which is saved in association with the finisher profile.

In step S603, the application program performs printing rendering via the OS on the basis of document data. In step S604, the printing rendering instruction issued to the OS is transferred as a printing rendering instruction to the graphic driver. The graphic driver converts the received printing rendering instruction into rendering information which can be interpreted by the image forming apparatus, and transmits the rendering information to the image forming apparatus as data (to be also simply referred a printing job) which forms the printing job.

Upon reception of the rendering information, in step S605, the image forming apparatus executes rendering and prints on the basis of the received rendering information. Examples of the page description language representing rendering information are LIPS, PCL, and PS. By the above-described procedures, the user can obtain a desired printed product.

Note that the address of a near-line finisher is made to correspond to a finisher profile by the image forming apparatus, and is read together with the finisher profile. The address of the near-line finisher may also be registered in the host computer in advance. Post-processing setting information which combines pieces of setting information of the near-line finisher is generated in correspondence with a selected finisher. For example, the functions and setting items of a selected near-line finisher are specified by its profile. As shown in FIG. 20, the setting items of a specified function are displayed in a detailed setting user interface window, and input values are combined to generate job control information. The generated job control information is transmitted to a corresponding near-line finisher, as described above.

Figure 23:
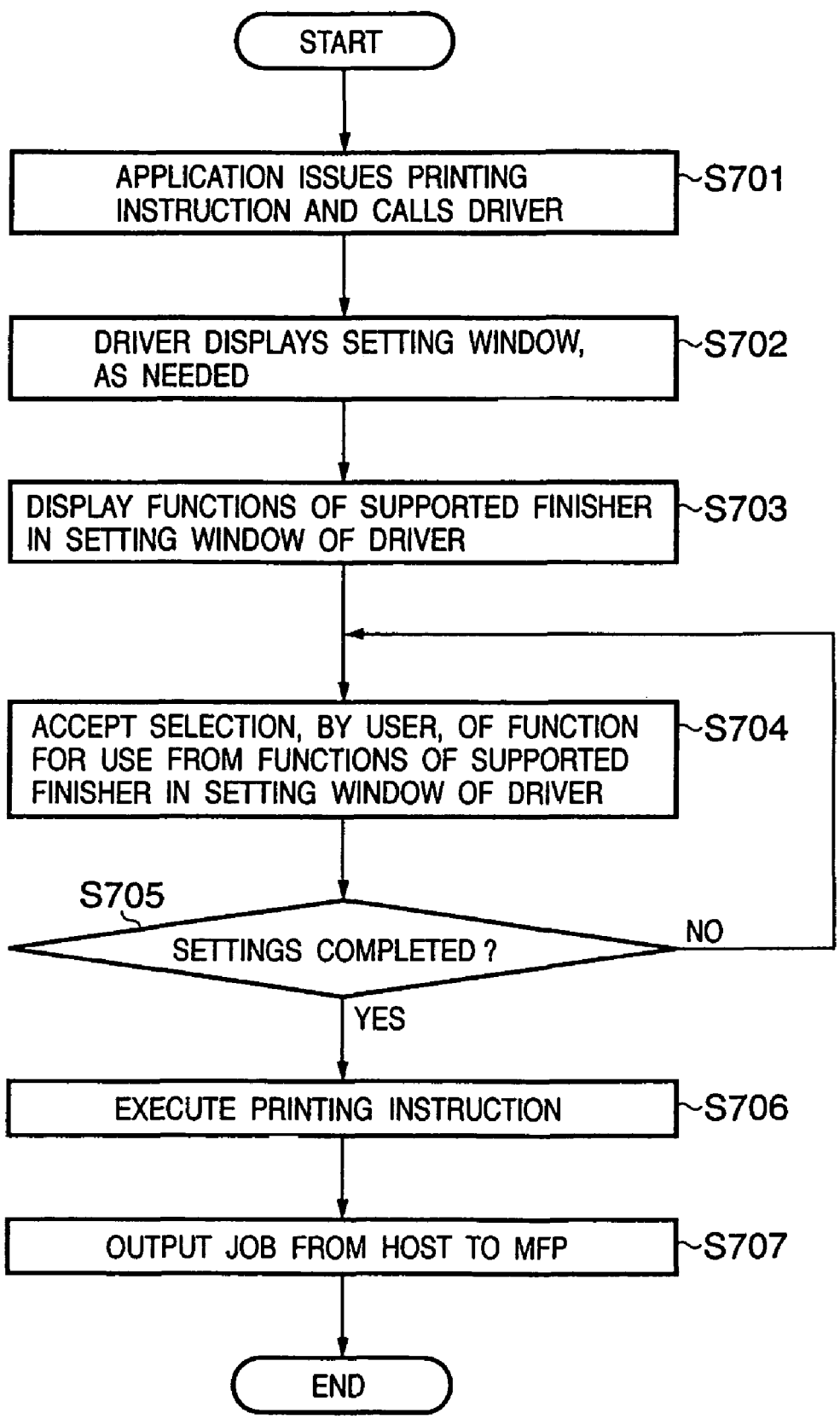
FIG. 23 is a flowchart showing processing in a host.

FIG. 23 shows another example of the flow of printing processing in the host. In the example of FIG. 23, the user can make print settings before the start of printing.

The user creates data to be printed by using an application, and calls the driver to print (step S701). After the property button 107 in FIG. 18 is clicked in order to set a finisher, the driver displays detailed setting windows (FIGS. 19 and 20) (step S702). In order to permit the user to set finishing processing, a detailed setting window is displayed in response to a click of the "details of finishing" button 307 or the like (step S703). If a finisher is selected in the "details of finishing" setting window from supported near-line finishers held as information by the printer driver, a setting window corresponding to a finishing function provided by the finisher is displayed (step S704). This processing is repeated until all settings are made (step S705). If settings are completed and the OK button (105) is clicked, printing processing is executed (step S706). In printing processing, the printer driver outputs job control information (which describes the contents of post-processing to an in-line finisher, as needed) and a rendering instruction (contents of a printing job) to the image forming apparatus (step S707). The printer driver outputs, to the near-line finisher, job control information which describes the contents of post-processing. A method of generating job control information to the near-line finisher is the same as that described in FIG. 22.

<Example of Structure of Job Control Information>

FIG. 24 shows an example of job control information. In the first embodiment, job control information is called a job ticket which is described in the JDF (Job Definition Format) format. The JDF is defined using XML. In FIG. 24, a "JDF" tag 2600 describes a job ID and the like. A "SaddleStitching-Params" tag 2601 is a parameter setting associated with saddle stitching, and a "CuttingParams" tag 2602 is a parameter setting associated with cutting. These tags are described in a "ResourcePool" tag, and described as resources (functions) used. A "ResourceLinkPool" tag 2603 describes an example of executing saddle stitching and then cutting. The format of this description is defined as the JDF, and processing to be executed can be described in accordance with the function of an in-line finisher. Casing-in bookbinding by a near-line finisher in FIG. 1 can also be described in the JDF. A case has been described in which both a bookbinding apparatus with the saddle stitch function and a cutting apparatus in FIG. 24 are registered as near-line finishers in the image processing apparatus.

In this manner, job control information describes the procedures of post-printing processing (post-press processing) which is to be performed by an apparatus at the destination of the job control information, and is transmitted to the destination. The procedures are parameters which are set to designate details of the operation of a finisher. For example, the procedures are parameters which define the staple position and interval, the number of pages to be stapled, the number of pages to be bound, the number of copies, the cutting size, and the like. The finisher saves parameters specified by the tag of job control information in a predetermined memory area corresponding to the tag, and executes post-processing in accordance with the parameter values. Alternatively, job control information may be directly saved to read necessary parameters using a tag as a key.

For example, job control information is described in accordance with finishing processing settings set in the user interface window, particularly "finishing" sheet of the printer driver. If saddle stitching is designated on the user interface, the tag 2601 in FIG. 24 is described. This also applies to other post-printing processing settings, and these settings are described in accordance with the JDF definition. For this purpose, a correspondence table is prepared which describes the correspondence between tags described in profile information, the identifiers of setting items, and tags described in job control information, and can be looked up by the printer driver. Fields settable by the user are displayed on the user interface in accordance with tags contained in the profile information. After settings are completed, tags corresponding to the set items (identifiers of items) are added to job control information, forming the job control information. The attribute value of each tag is transmitted to a finisher, read, and set as an operation parameter. This is merely an example, and any method can be adopted as far as set parameters and tags can be associated with each other.

<Finishing Processing>

Figure 25:
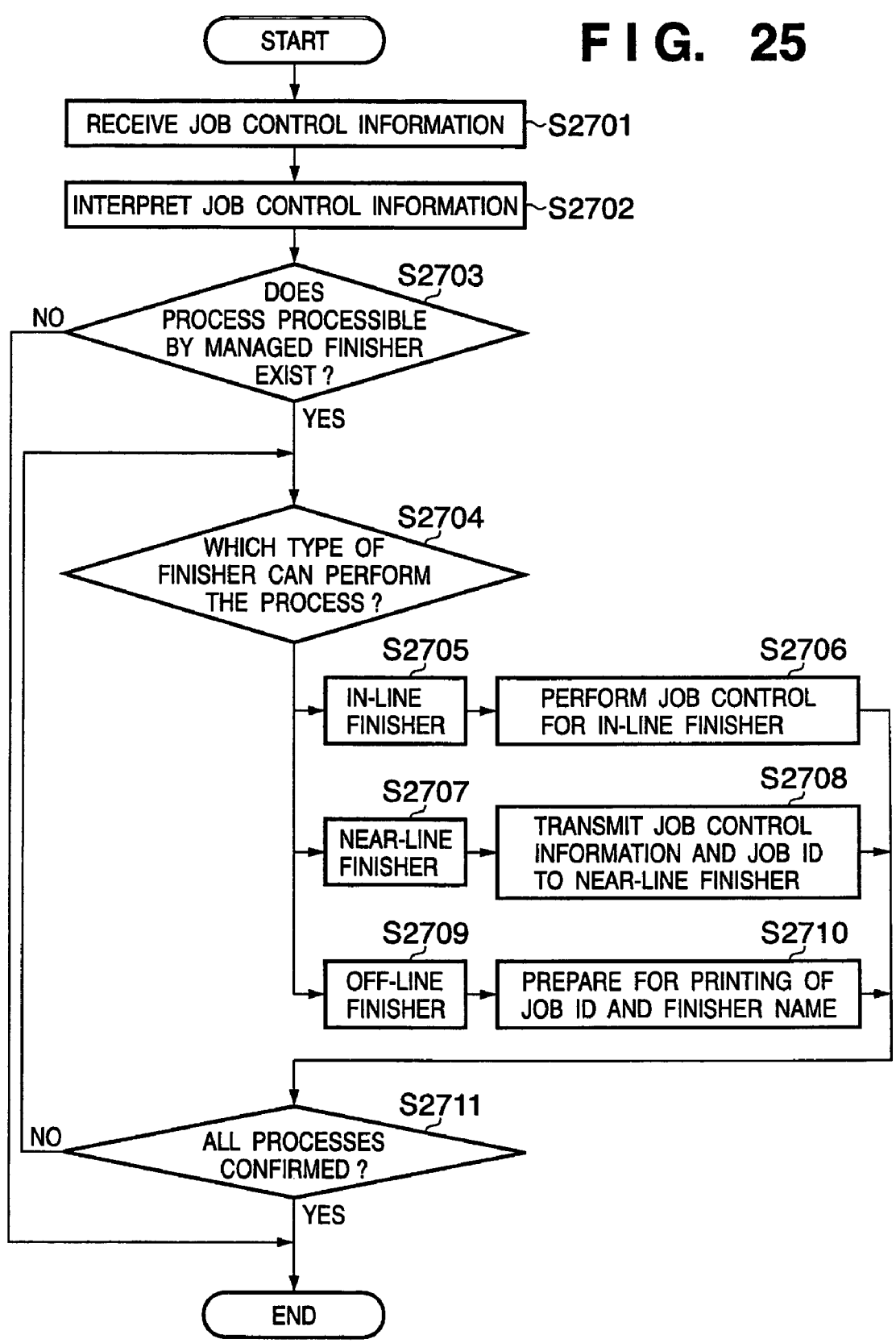
FIG. 25 is a flowchart showing finisher processing in the image forming apparatus.

A processing flow executed by the image forming apparatus in accordance with a description of finishing processing in job control information will be explained with reference to FIG. 25. In this case, the printer driver employs the first processing method, sets, in a printing job, job control information describing the contents of post-processing to a near-line finisher, and transmits the printing job to the image forming apparatus. Then, the image forming apparatus receives the job control information. In step S2701, job control information as described with reference to FIG. 25 is received from the printer driver or the like. The job control information is interpreted in step S2702, and it is determined in step S2703 from profile information managed in the image forming apparatus whether a finisher capable of processing the received job control information has been registered. For this purpose, for example, a correspondence table is prepared which describes the correspondence between tags described in profile information and tags described in job control information, and can be looked up by the control unit of the image forming apparatus. The finisher profile collected by the image forming apparatus is scanned for tags corresponding to tags described in the job control information. If the finisher profile is hit for all function tags, the job control information can be processed (i.e., designated finishing processing can be executed). In the first embodiment, step S2709 may be skipped because the printer driver generates job control information corresponding to a finisher profile.

If there is no process capable of performing processing described in a tag which is described in the job control information and represents a function, the processing ends. If even one process is detected, it is determined in step S2704 which type of finisher has been registered. If an in-line finisher has been registered, the flow advances to step S2705. In step S2706, a job to the in-line finisher is controlled in accordance with settings designated by the job control information. The determination in step S2704 can be achieved on the basis of, an IP address associated with profile information which is hit by scanning in step S2703. If the finisher is associated with an IP address, it is a near-line finisher. An off-line finisher does not have any profile information, and can be determined from a job ID or the like. For example, the job ID of job control information to an off-line finisher may have a code capable of determining the off-line finisher. In this case, in step S2703, job control information to an off-line finisher is excluded from determination targets.

If a process by a near-line finisher is detected, the image forming apparatus transmits the job control information and job ID to the near-line finisher in step S2708. The transmission destination is an IP address input upon connecting the near-line finisher. When the finisher is an off-line one, an instruction to prepare for printing of a job ID and designated finisher name is issued in step S2710.

In the first embodiment, when the printer driver adopts the second processing method, it directly transmits job control information to a destination finisher, and the printer receives only the job control information to the near-line finisher. Thus, step S2706 may be performed immediately after step S2702. In this case, the printer receives a printing job in addition to the job control information, and executes the printing job to perform printing processing.

In step S2711, it is determined whether all processes (post-processes) have ended. If a process to be executed remains, the flow returns to step S2704 to continue the processing for the next process. If it is determined in step S2711 that all processes have ended, the flow ends.

In the above fashion, post-processing is executed by the in-line finisher of the printer. Even if job control information of a near-line finisher is transmitted to the printer, the job control information can be transferred to the near-line finisher at the destination.

<Post-Printing Processing (1) by Near-Line Finisher>

Figure 26:
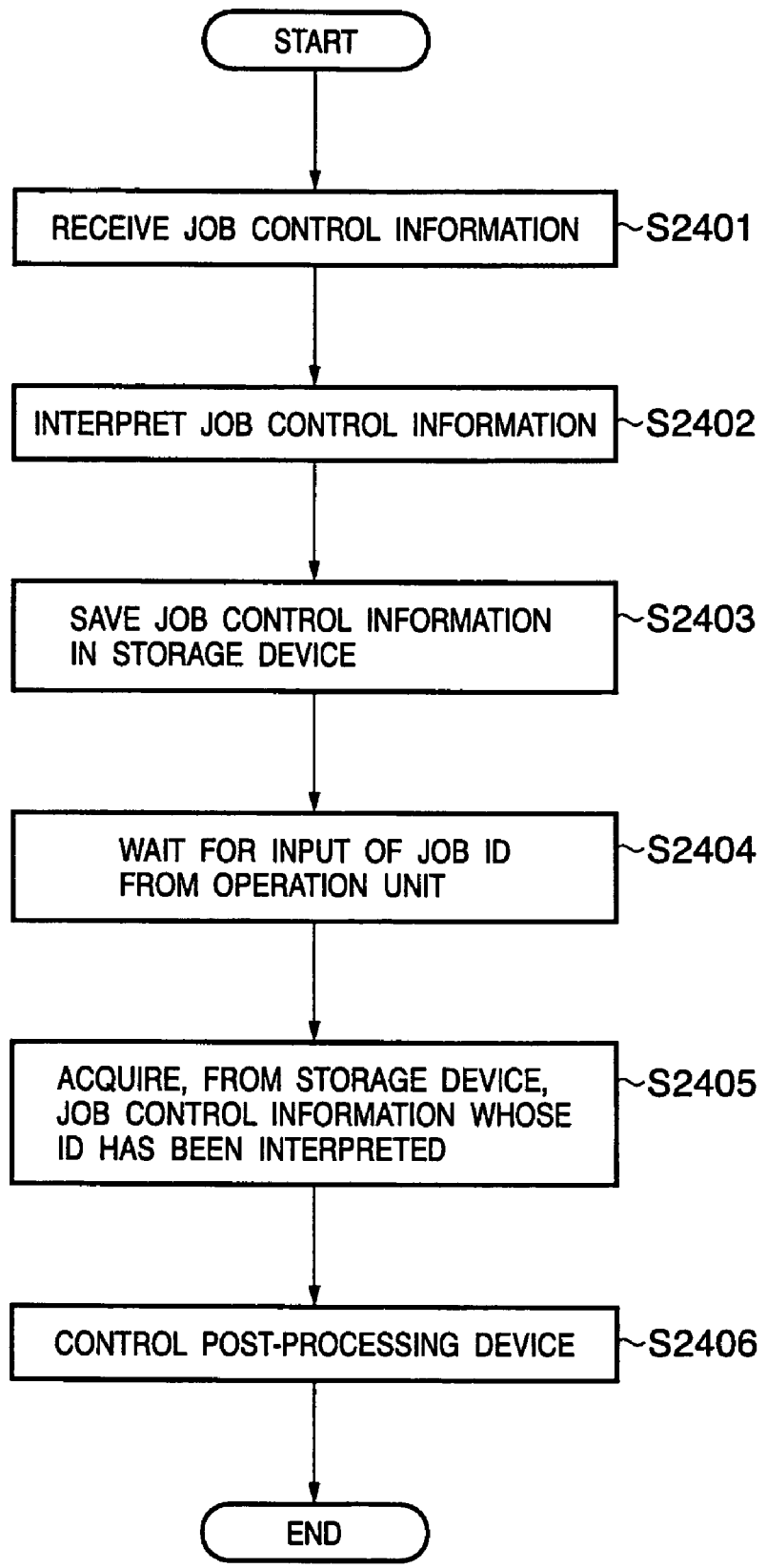
FIG. 26 is a flowchart showing processing in the near-line finisher.

FIG. 26 is a flowchart for explaining the flow of a series of processes in a near-line finisher which receives job control information. The near-line finisher receives job control information via the network unit 2101 from the printer driver (in the case of the second processing method) in the host computer or from image forming apparatus (in the case of the first processing method) (step S2401). While the job control information interpretation unit 2105 interprets the received job control information, it converts the job control information into an internal format capable of controlling a device (S2402). The converted job control information is saved in the storage device 2102 together with the job ID (step S2403). In this state, the flow waits for a job ID input from the user via the operation unit 2104 (step S2404).

After a job ID is input, in step S2405, the job control unit 2103 acquires corresponding job control information from the storage device 2102, sets it in the device control unit 2106, and causes the post-processing device 2200 to perform designated processing in accordance with settings.

As another method, a server (or MFP) which stores job control information may be added onto a network. In this case, (the address of) a job control information server is registered in a finisher. When a job ID is input from the operation unit, the finisher is connected to the job control information server. Job control information corresponding to the input job ID is acquired from the job control information server, and interpreted to control a post-processing device.

By the above procedures, the client computer can prompt the user to set post-printing processing using a near-line finisher on the basis of an acquired finisher profile. The printer driver generates and transmits job control information to the near-line finisher, and can execute post-printing processing by the near-line finisher. On the user interface of the printer driver, the user can exploit the near-line finisher without any consciousness that the finisher is a near-line one.

[First Modification]

<Post-Press Processing (2) by Near-Line Finisher>

Figure 27:
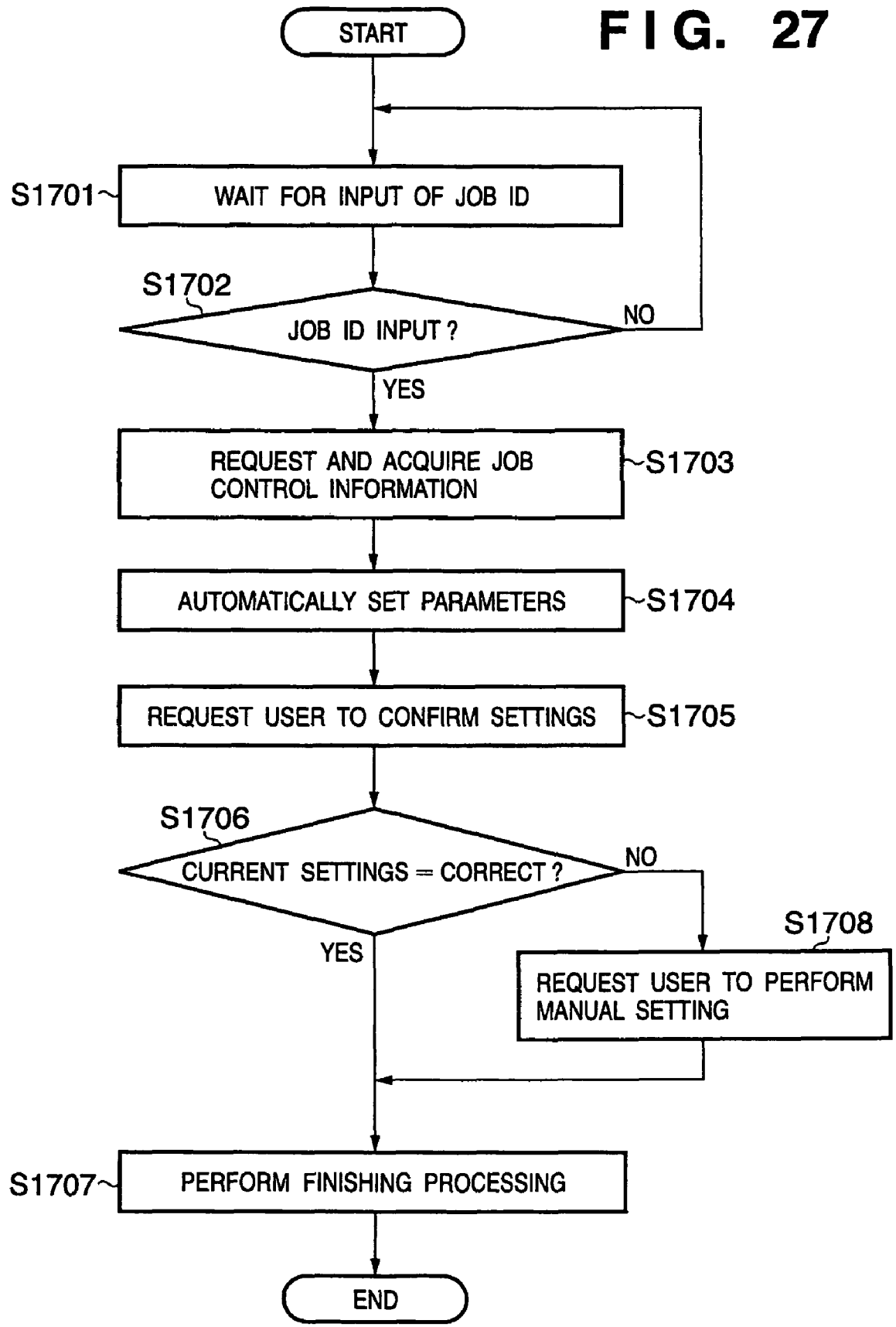
FIG. 27 is a flowchart showing the flow of processing on the finisher side.

FIG. 27 shows the flow of another processing example by a finisher. In this example, the printer driver does not transmit any job control information to a near-line finisher, and holds it until the Job control information is requested. If the finisher requests the job control information of the printer driver, the printer driver transmits the job control information in response to the request. This processing is defined as the third processing method.

In this modification, the finisher waits for a job ID input by the user from the operation unit 2104 (step S1701). In step S1702, the processor of the job control unit determines whether the job ID has been input. If the user has input the job ID, the processor requests job control information corresponding to the job ID of the host (client PC 1801), and acquires the job control information corresponding to the job ID (step S1703). If the printer driver receives, from the near-line finisher, the request for the job control information whose job ID is designated, it searches a storage area where the job control information (job ticket) corresponding to the designated job ID is saved, and sends back the searched job control information to the near-line finisher.

If no job ID is input, the near-line finisher keeps waiting for input of the job ID. In step S1704, the finisher automatically sets parameters and the like (e.g., paper width) which have conventionally been set manually by the operator on the basis of an output manual. In step S1705, the user is prompted to confirm the set contents. The user inputs whether the settings are incorrect or correct. On the basis of the user input, the near-line finisher determines whether the current settings are incorrect (step S1706). If the settings are correct, finishing processing is done on the basis of the set contents; if the settings are incorrect, the user is prompted in step S1708 to perform manual setting in order to correct incorrect contents. Finishing processing is done on the basis of the set contents. When a plurality of finishers are connected, the same processing is repeated for the next finisher.

[Second Modification]

In the first embodiment, the profile of a near-line finisher is collected by the printer and acquired by the printer driver. However, in the second processing method of transmitting job control information from the printer driver to a near-line finisher, the printer need not always collect profile information of the near-line finisher. A configuration in which the printer driver directly acquires the profile of a near-line finisher from the near-line finisher will be explained with reference to FIG. 28.

The printer driver specifies a finisher selected by the user. For example, the user selects a finisher for use by inputting the IP address of the finisher, or from a list of finishers on the network or a list of available finishers. The printer driver specifies the selected finisher in step S2801 (for example, the address or the like is written in a predetermined memory area). The printer driver inquires the selected finisher of whether the finisher has a profile (step S2802). If the finisher holds a profile, the printer driver directly requests the profile of the finisher (step S2803). If the finisher does not hold any profile, the printer driver requests the profile of the image forming apparatus (step S2804), and receives it (step S2805), similar to the first embodiment.

By the above-described method, the user can utilize even a finisher which is not registered in the image forming apparatus. Also, the image forming apparatus need not collect any finisher profile.

[Third Modification]

In the first embodiment, a finisher for use is selected on the user interface of the printer driver. To the contrary, in this modification, no finisher is selected, but the setting fields of functions provided by available finishers are displayed on the user interface without discriminating finishers. A near-line finisher for use is specified from set items. First, the printer driver displays the functions of available in- and near-line finishers on the detailed setting sheet so that these functions can be set. Then, a finisher associated with a set function is specified. If the specified finisher is a near-line one, job control information to the near-line finisher is generated and transmitted. The finisher can be specified by storing, in the RAM or the like, finisher function link information which links a function selection button (or setting box or field) on the user interface to an identifier for specifying a finisher. The link information can be created by referring to the finisher profile when the detailed setting sheet of the user interface is created. However, this is merely an example, and another method of associating a function and finisher can be employed. After finishing settings are made, job control information which combines functions set for each finisher is generated and transmitted to the finisher. When available functions overlap each other between a plurality of finishers, a finisher for use is determined in accordance with assigned priority, which will be described in the second embodiment. For example, the priority is set in the order of an in-line finisher, a near-line finisher, an in-line finisher of another image forming apparatus, an off-line finisher, and the like.

Second Embodiment

In some cases, the user can use a plurality of finishers. For example, the user can utilize an in-line finisher connected in line to a printer, a near-line finisher which is independent of the printer but is connected via a network, and an off-line finisher which is not connected even by communication. In this case, according to the first embodiment, the user is prompted to select a finisher for use on the user interface of the printer driver. The user can make settings of the selected finisher.

To the contrary, a purpose of the second embodiment is to provide an information processing apparatus which automatically selects a finisher, and allows the user to make settings without being aware of the presence of the finisher on the user interface of the printer driver.

Figure 29:
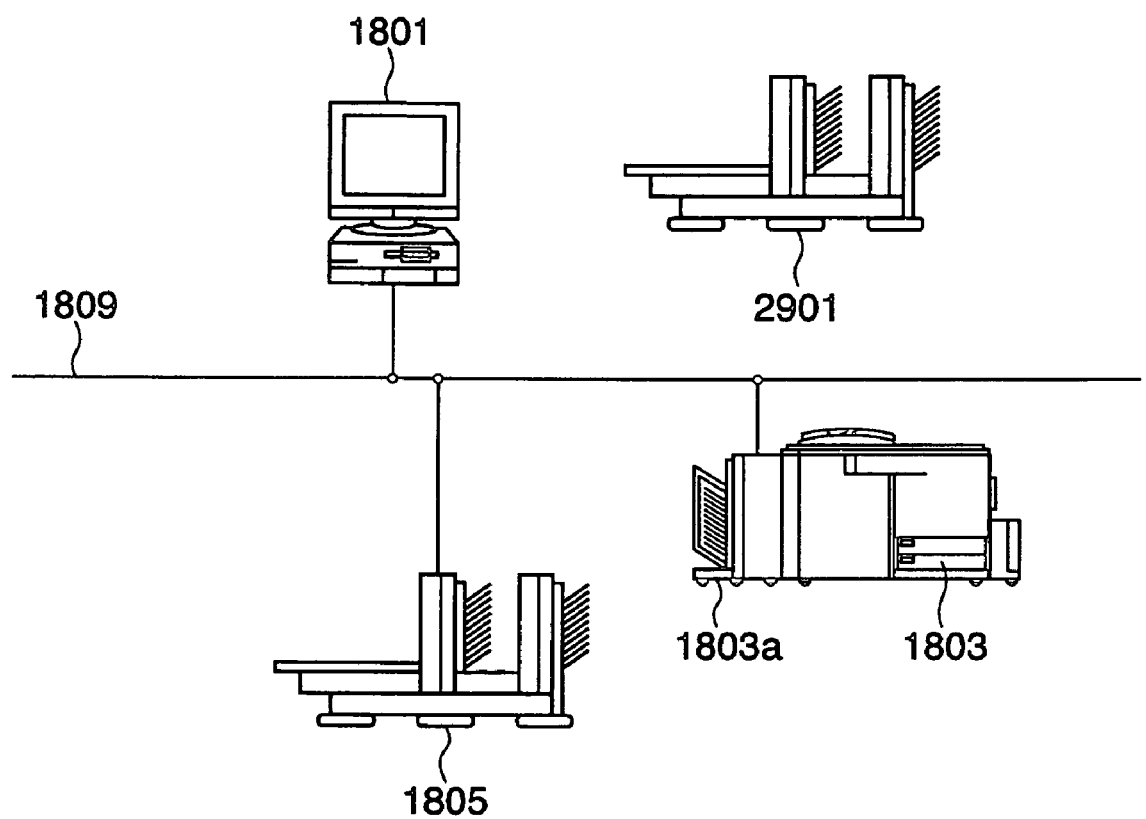
FIG. 29 is a view showing an example of a system configuration according to the second embodiment.

The second embodiment will be explained with reference to FIG. 29 and following drawings. FIG. 29 is a view showing an example of a system configuration according to the present invention. As shown in FIG. 29, this system comprises a client PC 1801, an image forming apparatus (printer) 1803, a bookbinding apparatus 1803a with the saddle stitch function serving as an example of an in-line finisher connected in line to the image forming apparatus, and a bookbinding apparatus 1805 with the saddle stitch function serving as an example of a near-line finisher connected to a network. These apparatuses can communicate with each other via a network. A bookbinding apparatus 2901 with the saddle stitch function serving as an off-line finisher not connected to the network is also a building component of the system. According to the second embodiment, a plurality of finishers having the same function are contained in the system. In the second embodiment, a difference from the first embodiment will be explained. An undescribed part of the second embodiment is the same as the first embodiment.

<Printing Processing Flow in Host>

Figure 30:
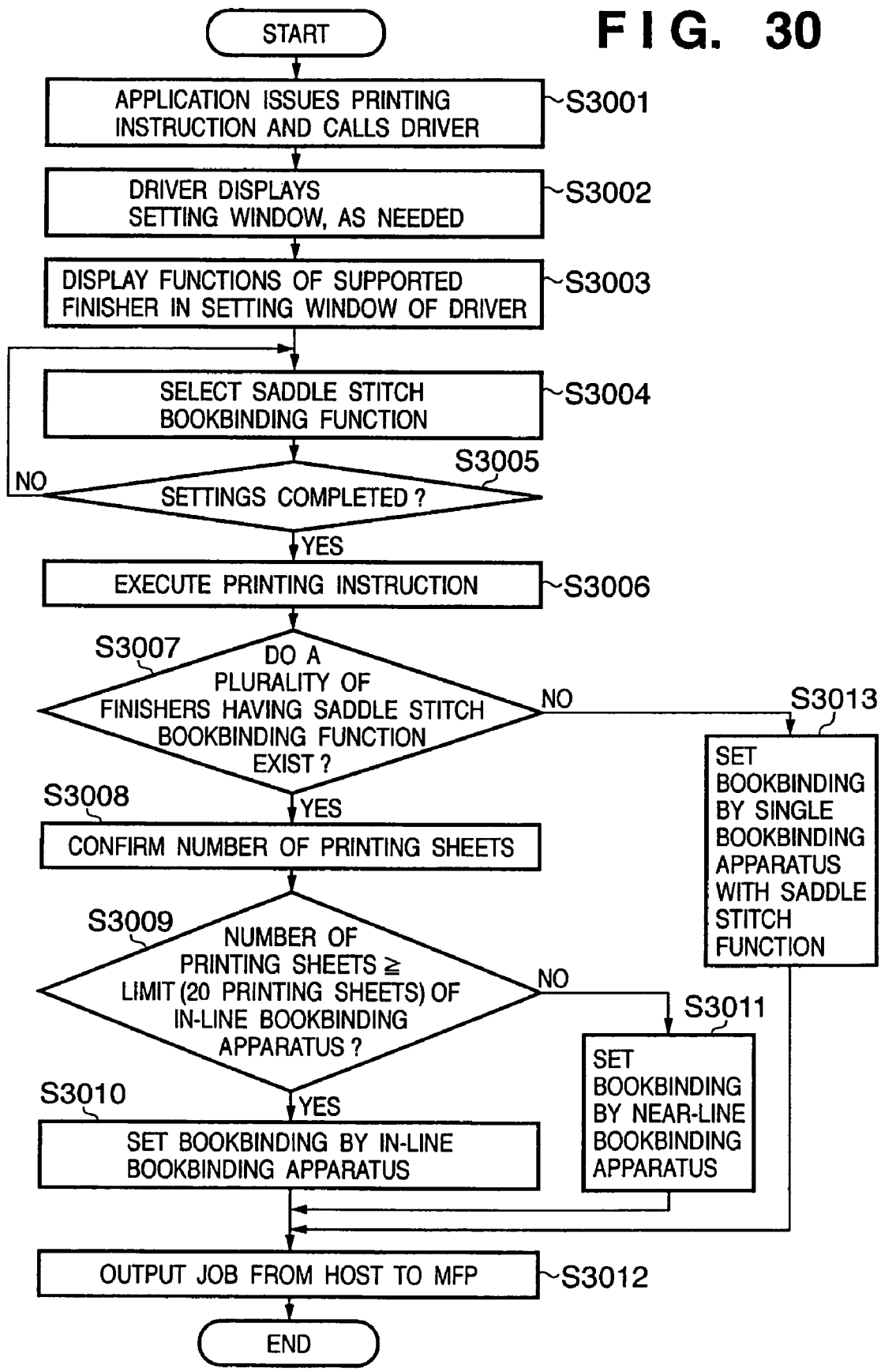
FIG. 30 is a flowchart showing processing in a host according to the second embodiment.

FIG. 30 shows the flow of processing in the host. Before this processing is done, the host computer acquires a finisher profile. This also applies to another modification. The profiles of in- and near-line finishers can be acquired similarly to the first embodiment. As for an off-line finisher, its profile is acquired from the vendor site of the Internet.

The user creates data to be printed by using an application, and calls a driver. In response to this, the driver is activated (S3001). In order to set a finisher, the driver displays a detailed setting window when the property button in FIG. 18 is clicked (S3002). In order to permit the user to set finishing processing for data to be printed, the driver further displays a detailed setting window (S3003). If a necessary function, i.e., the saddle stitch bookbinding function in the second embodiment is selected in this detailed setting window from a list of supported post-processing functions held as information by the driver, the setting window is displayed (S3004). The user can perform various settings in the window. This processing is repeated until all settings are made (S3005). If settings are completed, an OK button 105 is clicked to execute a printing instruction (S3006). In this case, a printing job to cause the image forming apparatus to print is generated. The driver determines whether there are a plurality of finishers having the saddle stitch bookbinding function (S3007). If there are a plurality of finishers, the number of printing sheets for use in the job is counted (S3008). The number of printing sheets can be counted, for example, by receiving the number of pages counted by the application program, by reading designation of the number of pages by the user, or from document data to be printed and printing settings. It is determined whether the number of printing sheets is equal to or smaller than a predetermined value (in the second embodiment, 20 printing sheets shown in FIG. 7) which is the limit of an in-line bookbinding apparatus (S3009). If the number of printing sheets is equal to or smaller than the limit value, the in-line bookbinding apparatus is automatically selected (S3010). A printing job containing printing data and the like, and job control information containing a post-processing instruction are output from the host to the image forming apparatus 1803 (S3012).

If the number of printing sheets is larger than the limit value, the current job cannot be processed by the in-line bookbinding apparatus 1803a. For this reason, a near-line bookbinding apparatus is instructed to perform the processing (S3011). The instruction is job control information. Similar to the first embodiment, if a corresponding near-line finisher can be specified, settings (values serving as parameters of the finisher: this also applies to the first embodiment) of post-printing processing (in this example, saddle stitch bookbinding) to be executed by the near-line finisher are transmitted. The printing job is transmitted to the MFP (S3012). In S3007, only one finisher has the saddle stitch bookbinding function, so job control information is generated and output to the bookbinding apparatus (S3013). Upon reception of the job control information, the finisher sets operation parameters in accordance with setting values contained in the job control information, and performs post-processing.

As described above, according to the second embodiment, when a client computer can use a plurality of finishers which provide the same function, it is determined whether an in-line finisher has the necessary performance. If the in-line finisher has the necessary performance, a finisher which uses the in-line finisher is determined, and job control information which describes post-processing parameters is issued to the in-line finisher. If the in-line finisher neither exists nor has any necessary performance, job control information which describes post-processing parameters is issued to a near-line finisher. In this manner, a finisher for use can be determined in accordance with the necessary performance.

[First Modification]

Figure 32:
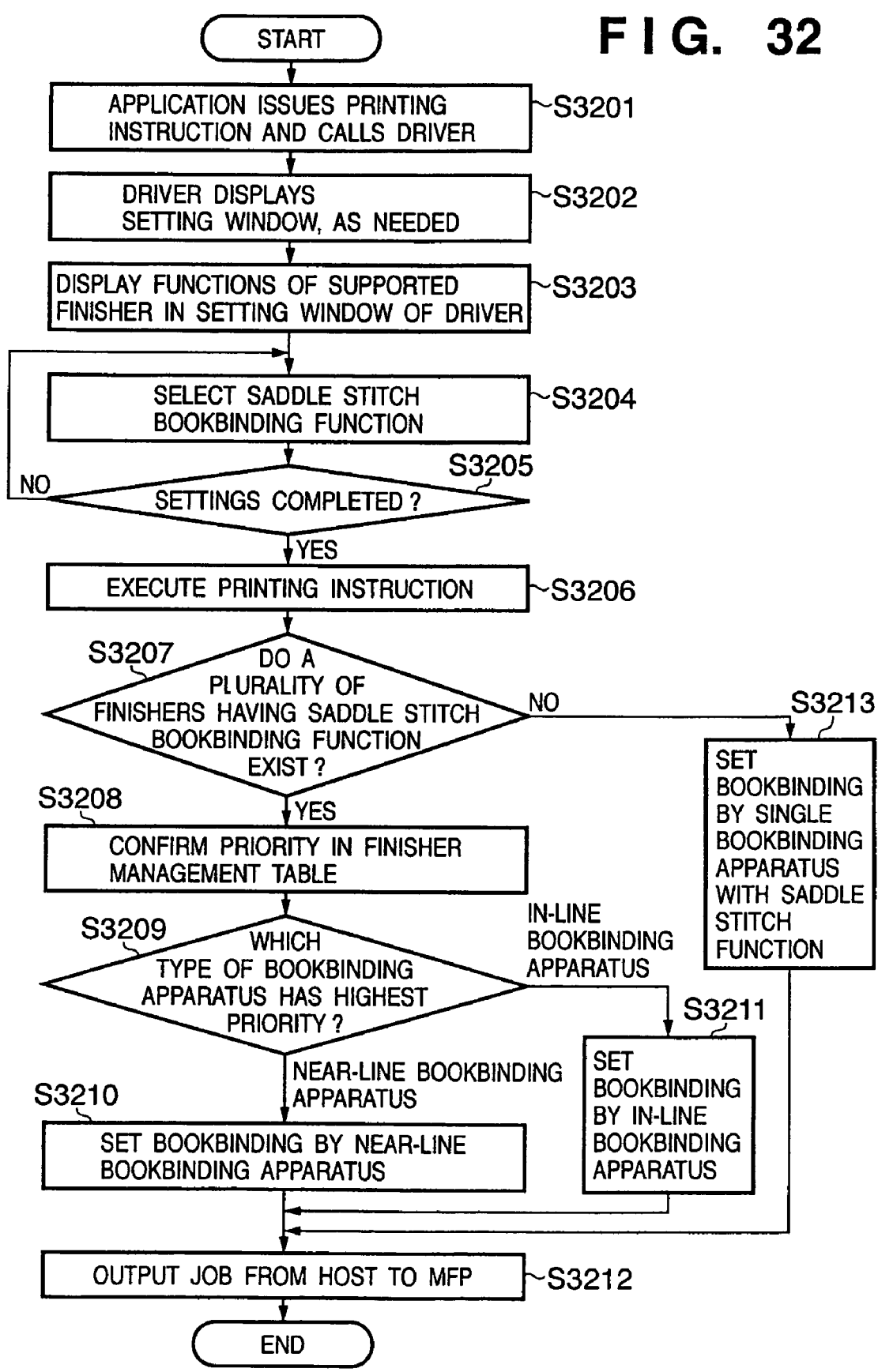
FIG. 32 is a flowchart showing processing in the host according to the first modification to the second embodiment.

The first modification to the second embodiment will be explained. FIG. 31 shows an example of some of the contents of a finisher management table 902 (FIG. 9). This table stores information on a finisher connectable to the image forming apparatus, as shown in FIG. 10. In this modification, priority is stored in addition to the items in FIG. 10 so as to allow the user to change the priority. The flow of printing processing by the host in this modification will be described with reference to FIG. 32.

The user creates data to be printed by using an application, and calls the driver to print. In response to this, the driver is activated (S3201). If the property button in FIG. 18 is clicked in the setting window, the driver displays a detailed setting window in order to set a finisher (S3202). In order to permit the user to set finishing processing for the data to be printed, the driver further displays a detailed setting window (finishing sheet) (S3203). If a necessary function, i.e., the saddle stitch bookbinding function in this modification is selected in the detailed setting window from a list of supported post-processing functions held as information by the driver (S3204), various settings are made. This processing is repeated until all settings are made for the saddle stitch bookbinding function (S3205). If settings are completed, the OK button 105 is clicked to execute a printing instruction (S3206). The driver determines whether there are a plurality of finishers having the saddle stitch bookbinding function (S3207). If there are a plurality of finishers, the priority is read from the finisher management table shown in FIG. 31 (S3208). A finisher having the highest priority is searched for, and if the finisher is a near-line bookbinding apparatus, bookbinding setting is performed for the near-line bookbinding apparatus (S3210). To perform bookbinding setting is to generate and transmit job control information in accordance with settings. If the finisher having the highest priority is an in-line bookbinding apparatus, bookbinding setting is performed for the in-line bookbinding apparatus (S3211). Thereafter, the host outputs a job to the MFP (S3212). If only one finisher has the saddle stitch bookbinding function in step S3207, setting is done for the bookbinding apparatus (S3213). Then, the processing ends.

As described above, according to the first modification, when a client computer can use a plurality of finishers which provide the same function, priorities set to the respective finishers are determined. A finisher having the highest priority is determined as a finisher for use, and job control information which describes post-processing parameters is issued to the finisher. A finisher for use can be determined in advance, and when the finisher fails, can be changed by changing priority. In this way, a finisher for use can be determined in accordance with the user's will.

[Second Modification]

The second modification to the second embodiment will be explained with reference to FIG. 33. When there are a plurality of finishers having the same performance in the second embodiment, a system according to the second modification prompts the user to select one of the finishers.

The user creates data to be printed by using an application, and calls the driver. In response to this, the driver is activated (S3301). If the property button in FIG. 18 is clicked, the driver displays a detailed setting window in order to permit the user to set a finisher (S3302). In order to permit the user to set finishing processing for the data to be printed, the driver further displays a detailed setting window (S3303). If a necessary function, i.e., the saddle stitch bookbinding function in this modification is selected in the detailed setting window from a list of supported post-processing functions held as information by the driver, a setting window for the saddle stitch bookbinding function is displayed (S3304). The user can make various settings in this window. This processing is repeated until all settings are made (S3305). If settings are completed, the OK button 105 is clicked to execute a printing instruction (S3306). At this time, a printing job to cause the image forming apparatus to print is generated. The driver determines whether there are a plurality of finishers having the saddle stitch bookbinding function (S3307). If there are a plurality of finishers, the number of printing sheets for use in the Job is counted (S3308). The number of printing sheets can be counted, for example, by receiving the number of pages counted by the application program, by reading designation of the number of pages by the user, or from document data to be printed and printing settings. It is determined whether the number of printing sheets is equal to or smaller than a predetermined value (in the second modification, 20 printing sheets shown in FIG. 7) serving as the limit of an in-line bookbinding apparatus (S3309). If the number of printing sheets is equal to or smaller than the limit value, post-processing can be done by an in-line finisher and near-line finisher. Hence, for example, a list of available finishers (including in- and near-line finishers) is displayed to prompt the user to select a finisher (S3310). If the user selects one of the finishers, job control information to be transmitted to the selected finisher is generated and transmitted to the selected finisher (S3311). A printing job containing printing data and the like is output from the host to the image forming apparatus 1803 (S3313).

If the number of printing sheets is larger than the limit value, the current job cannot be processed by the in-line bookbinding apparatus 1803a. For this reason, a near-line bookbinding apparatus is instructed to perform the processing (S3312). The instruction is job control information. Similar to the first embodiment, if a corresponding near-line finisher can be specified, settings (values serving as parameters of the finisher: this also applies to the first embodiment) of post-printing processing (in this example, saddle stitch bookbinding) to be executed by the near-line finisher are transmitted. The printing job is transmitted to the MFP (S3313). In S3307, only one finisher has the saddle stitch bookbinding function, so job control information is generated and output to the bookbinding apparatus (S3314). Upon reception of the job control information, the finisher sets operation parameters in accordance with setting values contained in the job control information, and performs post-processing.

As described above, according to the second modification, when a client computer can use a plurality of finishers which provide the same function, it is determined whether an in-line finisher has necessary performance. If the in-line finisher has necessary performance, the user is prompted to select one of available in- and near-line finishers, and the selected finisher is determined as a finisher for use. Then, job control information which describes post-processing parameters is issued to the selected finisher. If the in-line finisher neither exists nor has any necessary performance, job control information which describes post-processing parameters is issued to a near-line finisher. As a result, a finisher for use can be determined in accordance with necessary performance. Also, the user can select a proper one of finishers having necessary performance.

[Third Modification]

Figure 33:
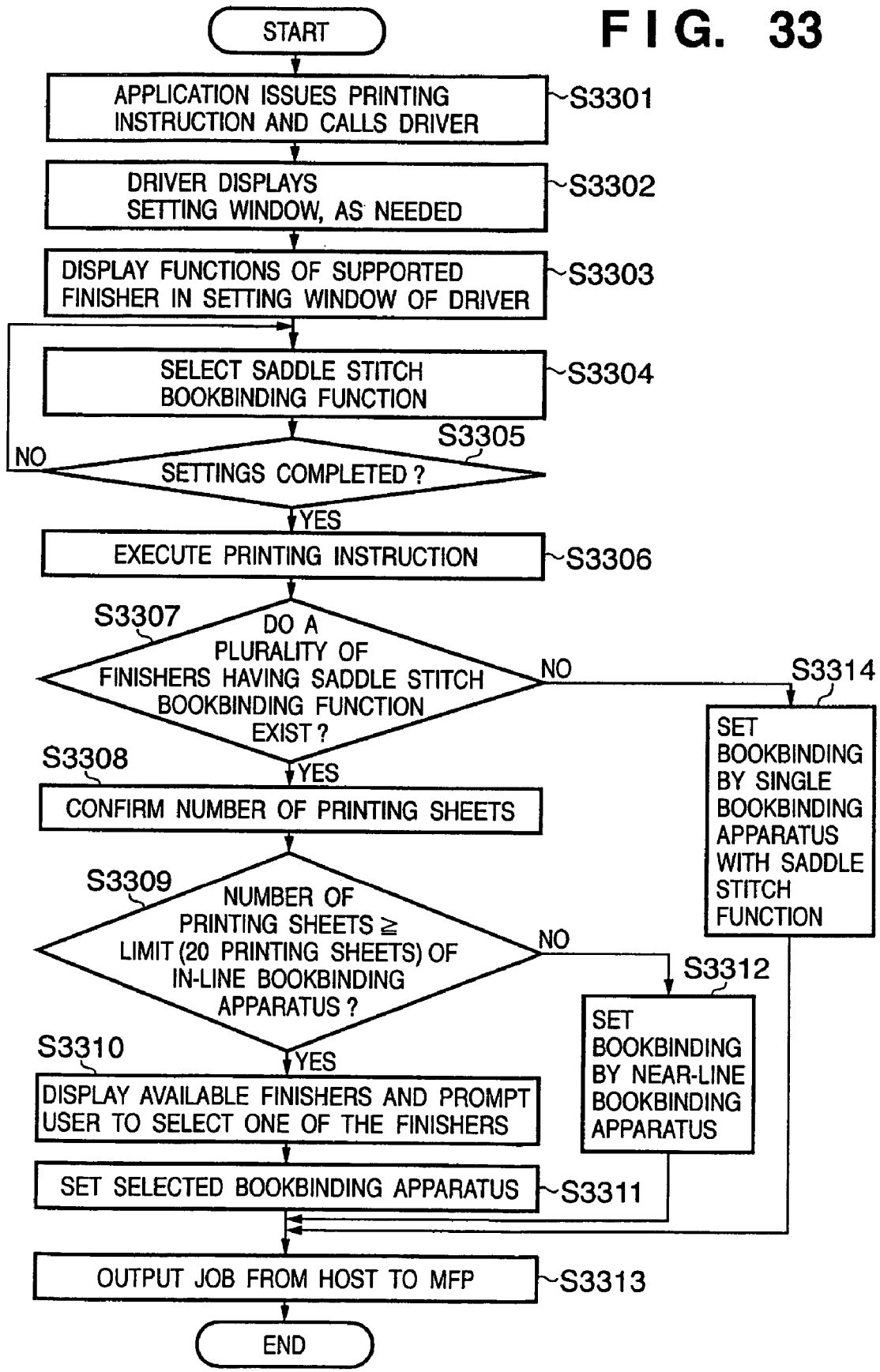
FIG. 33 is a flowchart showing processing in the host according to the second modification to the second embodiment.

In step S3310 of FIG. 33, the user is prompted to select a finisher. Alternatively, a finisher having the highest priority can also be selected by looking up the priority table in FIG. 31. In this configuration, a finisher having the highest priority can be selected from available finishers without unconditionally obeying priority.

The present invention may be applied to a system including a plurality of devices (e.g., a host computer, interface device, reader, and printer) or an apparatus including a single device (e.g., a copying machine or facsimile apparatus). The object of the present invention is achieved even by supplying a storage medium (or recording medium) which records software program codes to implement the functions of the above-described embodiments to the system or apparatus and causing the computer (or CPU or MPU) of the system or apparatus to read out and execute the program codes stored in the storage medium. In this case, the program codes read out from the storage medium implement the functions of the above-described embodiments by themselves, and the program codes and the storage medium which stores the program codes constitute the present invention.

The functions of the above-described embodiments are implemented not only when the readout program codes are executed by the computer but also when the operating system (OS) or the like running on the computer performs part or all of actual processing on the basis of the instructions of the program codes. The functions of the above-described embodiments are also implemented when the program codes read out from the storage medium are written in the memory of a function expansion card inserted into the computer or a function expansion unit connected to the computer, and the CPU of the function expansion card or function expansion unit performs part or all of actual processing on the basis of the instructions of the program codes.

<Functional Blocks of Apparatus>

FIG. 34 is a functional block diagram showing a printing control apparatus according to the present invention. Units which build the apparatus in FIG. 34 are implemented by executing programs shown in the flowcharts by a computer in the above-described embodiments.

In FIG. 34, an image forming apparatus 3402 saves function information (corresponding to a profile) 3402a. The function information may also contain function information 3403a of a post-processing apparatus (corresponding to a finisher) 3403. This corresponds to a case wherein the MFP (corresponding to an image forming apparatus) 1801 saves a profile, as shown in FIG. 6.

An information processing apparatus 3401 transmits printing data to the image forming apparatus. At this time, a loading unit 3411 loads function information representing the function of the post-printing processing apparatus 3403. Based on the function information, an identification unit 3412 identifies a printing function processible by the printing apparatus, and a post-processing function processible after printing by the post-printing processing apparatus. A display control unit 3415 displays, on a display unit 3417, a setting window for setting a printing function and post-processing function. A setting information generation unit 3416 generates setting information (post-processing setting information) of post-printing processing to be executed by the post-printing processing apparatus 3403, and saves the information in setting information 3418. On the basis of printing setting information input via the displayed setting window, a data generation unit 3413 generates printing data to be printed by the image forming apparatus 3402. At this time, printing data is generated by referring to post-processing setting information 3418b and printing setting information 3418a. The printing data generated by the data generation unit 3413 is transmitted to the image forming apparatus 3402. The post-processing setting information 3418b generated by the setting information generation unit 3416 is transmitted to the post-printing processing apparatus 3403 or the image forming apparatus 3402.

Note that the loading unit 3411 is implemented by steps S1501, S1502, and S1504 in FIG. 17. The identification unit 3412 and display control unit 3415 are implemented by executing step S503 in FIG. 21. The setting information generation unit 3416 and data generation unit 3413 correspond to a graphic driver. The graphic driver reads out saved printing setting information from the printer driver setting save area 403 of the OS in accordance with a printing start instruction. The graphic driver generates printing data which is job control information to the image forming apparatus, and post-processing setting information which is job control information for designating finishing settings for a selected finisher.

EFFECTS OF PRESENT INVENTION DESCRIBED IN EMBODIMENTS

According to the above-described embodiments and modifications, the printer driver can generate and transmit job control information for even a near-line finisher for use, similar to the printer. A finisher can be set without manually setting the finisher by the user. Thus, the productivity of the post-printing processing step can be increased, and any setting error can be prevented. The near-line finisher itself has profile information, and the client computer collects the profile information directly or via the printer. This can save the labor of inputting information on a newly connected near-line finisher.

Since job control information issued from the printer driver is transferred to a near-line finisher via the printer, the printer driver need neither particularly generate nor transmit job control information for the near-line finisher. Programming work of the printer driver can be simplified, which contributes to reduction of the code amount and a decrease in program errors.

When a plurality of finishers are available, a finisher designated on the basis of priority can be preferentially adopted. By changing the priority, the user can designate a finisher for use.

By preferentially using an in-line finisher, convey work of a printed product from a printing apparatus to a post-processing apparatus can be reduced, which contributes to savings in labor and an increase in productivity.

As many apparently widely different embodiments of the present invention can be made without departing from the spirit and scope thereof, it is to be understood that the invention is not limited to the specific embodiments thereof except as defined in the appended claims.

This application claims the benefit of Japanese Application No. 2005-128619, filed Apr. 26, 2005, which is hereby incorporated by reference herein in its entirety.

What is claimed is:

1. An information processing apparatus which communicates with a printing device which is coupled with a first post-printing processing device via a paper conveying path of the printing device and a second post-printing processing device which is not coupled with the printing device via the paper conveying path of the printing device, comprising:
   a display control unit configured to display a setting screen to receive setting information on (i) a printing function for the printing device, and (ii) a post-printing processing function for a post-printing processing device;
   a setting unit configured to set priority for the first post-printing processing device and the second post-printing processing device;
   a determination unit configured to determine the priority of the first and second post-printing processing devices when both the first and second post-printing processing devices can perform the post-printing processing function set via the setting screen; and
   a selecting unit configured to select the first post-printing processing device as the post-printing processing device performing the post-printing processing function when the determination unit determines that the priority of the first post-printing processing device is higher than the priority of the second post-printing processing device, and to select the second post-printing processing device as the post-printing processing device performing the post-printing processing function when the determination unit determines that the priority of the second post-printing processing device is higher than the priority of the first post-printing processing device.

2. The apparatus according to claim 1, further comprising a transmission control unit configured to transmit to the printing device print data generated based on the printing function and the post-printing processing function set via the setting screen displayed by said display control unit when the first post-printing processing device has been selected by said selecting unit.

3. The apparatus according to claim 1, wherein said selecting unit selects the second post-printing processing device when the first post-printing processing device is incapable of the post-processing function set via the setting screen and the second post-processing device is capable of the post-processing function, and
   said transmission control unit transmits the print data containing data on the printing function to the printing device and the post-printing processing information on the post-printing function to the second post-printing processing device when the second post-printing processing device has been selected by said selecting unit.

4. The apparatus according to claim 1, wherein the first and second post-printing processing device provide a saddle stitch bookbinding function,
   said selecting unit selects the first post-printing processing device when the first post-printing processing device is determined to be capable of the saddle stitch bookbinding based on a limit of the number of sheets of bookbinding processing by the first-post-printing processing device and the number of sheets to be printed based on the print data, and
   said selecting unit selects the second post-printing processing device when the first post-printing processing device is determined to be incapable of the saddle stitch bookbinding based on the limit of the number of sheets of bookbinding processing by the first post-printing processing device and the number of sheets to be printed based on the print data.

5. A method performed by an information processing apparatus which communicates with a printing device coupled with a first post-printing processing device via a paper conveying path of the printing device and a second post-printing processing device which is not coupled with the printing device via the paper conveying path of the printing device, said method comprising the steps of:
   controlling a setting screen configured to receive setting information on (i) a printing function for the printing device, and (ii) a post-printing processing function for a post-printing processing device;
   setting priority for the first post-printing processing device and the second post-printing processing device;
   determining the priority of the first and second post-printing processing devices when both the first and second post-printing processing devices can perform the post-printing processing function set via the setting screen; and
   selecting the first post-printing processing device as the post-printing processing device performing the post-printing processing function when the priority of the first post-printing processing device is determined to be higher than the priority of the second post-printing processing device, and selecting the second post-printing processing device as the post-printing processing device performing the post-printing processing function when the priority of the second post-printing processing device is determined to be higher than the priority of the first post-printing processing device.

6. The method according to claim 5, further comprising a step of transmitting to the printing device print data generated based on the printing function and the post-printing processing function set via the setting screen displayed in said controlling step when the first post-printing processing device has been selected in said selecting step.

7. The method according to claim 5, wherein the second post-printing processing device is selected in said selecting step when the first post-printing processing device is incapable of the post-processing function set via the setting screen and the second post-processing device is capable of the post-processing function, and
   said transmitting step transmits the print data containing data on the printing function to the printing device and the post-printing processing information on the post-printing function to the second post-printing processing device when the second post-printing processing device has been selected in said selecting step.

8. The method according to claim 5, wherein the first and second post-printing processing device provide a saddle stitch bookbinding function,
   the first post-printing processing device is selected in said selecting step when the first post-printing processing device is determined to be capable of the saddle stitch bookbinding based on a limit of the number of sheets of bookbinding processing by the first-post-printing processing device and the number of sheets to be printed based on the print data, and
   the second post-printing processing device is selected in said selecting step when the first post-printing processing device is determined to be incapable of the saddle stitch bookbinding based on the limit of the number of sheets of bookbinding processing by the first post-printing processing device and the number of sheets to be printed based on the print data.

9. A non-transitory computer readable medium storing computer code for causing an information processing apparatus, which communicates with a printing device coupled with a first post-printing processing device via a paper conveying path of the printing device and a second post-printing processing device which is not coupled with the printing device via the paper conveying path of the printing device, to perform the steps of:

controlling a setting screen configured to receive setting information on (i) a printing function for the printing device, and (ii) a post-printing processing function for a post-printing processing device;

setting priority for the first post-printing processing device and the second post-printing processing device;

determining the priority of the first and second post-printing processing devices when both the first and second post-printing processing devices can perform the post-printing processing function set via the setting screen; and selecting the first post-printing processing device as the post-printing processing device performing the post-printing processing function when the priority of the first post-printing processing device is determined to be higher than the priority of the second post-printing processing device, and selecting the second post-printing processing device as the post-printing processing device performing the post-printing processing function when the priority of the second post-printing processing device is determined to be higher than the priority of the first post-printing processing device.

10. The computer readable medium according to claim 9, further comprising code for causing the information processing apparatus to perform a step of transmitting to the printing device print data generated based on the printing function and the post-printing processing function set via the setting screen displayed in said controlling step when the first post-printing processing device has been selected in said selecting step.

11. The computer readable medium according to claim 9, wherein the second post-printing processing device is selected in said selecting step when the first post-printing processing device is incapable of the post-processing function set via the setting screen and the second post-processing device is capable of the post-processing function, and said transmitting step transmits the print data containing data on the printing function to the printing device and the post-printing processing information on the post-printing function to the second post-printing processing device when the second post-printing processing device has been selected in said selecting step.

12. The computer readable medium according to claim 9, wherein the first and second post-printing processing device provide a saddle stitch bookbinding function, the first post-printing processing device is selected in said selecting step when the first post-printing processing device is determined to be capable of the saddle stitch bookbinding based on a limit of the number of sheets of bookbinding processing by the first-post-printing processing device and the number of sheets to be printed based on the print data, and the second post-printing processing device is selected in said selecting step when the first post-printing processing device is determined to be incapable of the saddle stitch bookbinding based on the limit of the number of sheets of bookbinding processing by the first post-printing processing device and the number of sheets to be printed based on the print data.

* * * * *